(12) United States Patent
Cho

(10) Patent No.: US 9,764,751 B2
(45) Date of Patent: Sep. 19, 2017

(54) CARRIER WITH FOLDABLE WHEELS

(71) Applicant: Won-sang Cho, Asan-si (KR)

(72) Inventor: Won-sang Cho, Asan-si (KR)

( * ) Notice: Subject to any disclaimer, the term of this patent is extended or adjusted under 35 U.S.C. 154(b) by 0 days.

(21) Appl. No.: 15/309,444

(22) PCT Filed: May 11, 2015

(86) PCT No.: PCT/KR2015/004677
§ 371 (c)(1),
(2) Date: Nov. 8, 2016

(87) PCT Pub. No.: WO2015/174699
PCT Pub. Date: Nov. 19, 2015

(65) Prior Publication Data
US 2017/0144684 A1    May 25, 2017

(30) Foreign Application Priority Data

| | | |
|---|---|---|
| May 11, 2014 | (KR) | 10-2014-0056060 |
| Jun. 13, 2014 | (KR) | 10-2014-0072173 |
| Jul. 2, 2014 | (KR) | 10-2014-0082424 |
| Nov. 8, 2014 | (KR) | 10-2014-0154838 |

(51) Int. Cl.
*B62B 3/02* (2006.01)
*A45C 5/04* (2006.01)
*A45C 5/14* (2006.01)
*A45C 5/03* (2006.01)
(Continued)

(52) U.S. Cl.
CPC ............... *B62B 3/022* (2013.01); *A45C 5/03* (2013.01); *A45C 5/04* (2013.01); *A45C 5/14* (2013.01); *A45C 13/385* (2013.01); *A63B 55/30* (2015.10); *A63B 2210/50* (2013.01); *B62B 2301/04* (2013.01)

(58) Field of Classification Search
CPC ..... B62B 3/022; B62B 2301/04; A63B 55/30; A63B 2210/50; A45C 5/03; A45C 5/04; A45C 5/14; A45C 5/146; A45C 13/38; A45C 13/385
USPC ................ 280/639, 38, 39, 40, 646, 42
See application file for complete search history.

(56) References Cited

U.S. PATENT DOCUMENTS 4,314,624 A * 2/1982 Royet .................. A45C 5/146
16/113.1
4,993,727 A    2/1991 Vom Braucke et al.
(Continued)

FOREIGN PATENT DOCUMENTS

JP    11-180309 A    7/1999
KR    20-0276973 Y1    5/2002
(Continued)

OTHER PUBLICATIONS

International Search Report for PCT/KR2015/004677 dated Jul. 31, 2015 from Korean Intellectual Property Office.

*Primary Examiner* — John Walters
(74) *Attorney, Agent, or Firm* — Revolution IP, PLLC

(57) ABSTRACT

Disclosed is a device for turning rotatable rods for folding or unfolding wheels of a carrier, the device comprising: a pair of rotatable rods, each of which comprises one or more helical lines; a cross bar comprising helical line coupling portions coupled to one or more helical lines, and one or more elastic members, which provide restoring forces to the cross bar.

11 Claims, 36 Drawing Sheets

(51) Int. Cl.
*A45C 13/38* (2006.01)
*A63B 55/30* (2015.01)

(56) References Cited

U.S. PATENT DOCUMENTS

| | | | | |
|---|---|---|---|---|
| 5,348,325 | A | * | 9/1994 | Abrams .................... B62B 1/12 280/40 |
| 5,435,546 | A | | 7/1995 | Rao |
| 6,739,150 | B2 | * | 5/2004 | Mompo Garcia ... A45C 13/262 220/629 |
| 2016/0045000 | A1 | * | 2/2016 | Green .................. A45C 13/262 280/47.21 |

FOREIGN PATENT DOCUMENTS

| | | |
|---|---|---|
| KR | 10-0395144 B1 | 8/2003 |
| KR | 10-1218439 B1 | 1/2013 |
| KR | 10-2014-0011988 A | 1/2014 |

\* cited by examiner (a)

(b)

(c)

(a)

CARRIER WITH FOLDABLE WHEELS

CROSS REFERENCE TO PRIOR APPLICATIONS

This application is a National Stage Application of PCT International Patent Application No. PCT/KR2015/004677 filed on May 11, 2015, under 35 U.S.C.§371, which claims priority to Korean Patent Application Nos. KR 10-2014-0056060 filed on May 11, 2014, KR 10-2014-0072173 filed on Jun. 13, 2014, KR 10-2014-0082424 filed on Jul. 2, 2014, and KR 10-2014-0154838 filed on Nov. 8, 2014, which are all hereby incorporated by reference in their entirety.

BACKGROUND

The present invention relates to a carrier with foldable wheels, and more particularly, to devices for turning the rotatable rods for folding or unfolding the wheels of the carrier, and for reducing weight of the carrier and for increasing portability thereof by decreasing the length of the rotatable rods.

Carriers with wheels such as luggage may be conveniently used for various activities such as travelling or shopping. However, a carrier with small wheels is difficult to move over uneven road surfaces. Also, the bottom edges and corners of the luggage touch the ground and are worn down and become easily coated with dirt.

When wheels are large, the problems described above may be solved, however carriers are inconvenient for storage and can be aesthetically unpleasing. Accordingly, the wheels of carrier should be slightly large and may be unfolded or folded as necessary. A carrier with foldable wheels has been filed by the present applicant and registered as Korean Patent Registration No. 10-1218439. The prior patent discloses a structure in which, the length of the rotatable rods is increased, and the weight of the carrier increases. Due to the increased length, much more force is needed when it is necessary to lift and move the carrier.

FIG. 1 is a schematic perspective view of a carrier 1000 according to one embodiment of the previously registered patent filed by the present applicant. As shown in FIG. 1, rotatable rod 310 (which includes a pair of helical lines 301*a* and 301*b*) and rotatable rod 320 (which includes a pair of rotatable rods 302*a* and 302*b*) are installed on one surface of body 400.

On the carrier 1000 of FIG. 1, wheels 330 and 340 are unfolded and spread apart because handle 370 is pulled up to raise handle bars 350 and 360 in such a way that rotatable rods 310 and 320 rotate about an axis in a longitudinal direction by a certain angle.

FIG. 2 illustrates a state in which wheels 330 and 340 are folded toward the center because handle 370 is pressed down to lower handle bars 350 and 360.

Handle bar 350 and cross bar 93 formed as one, as are handle bar 360 and cross bar 94.

Because it is necessary to form sections of helical lines 301*a*, 301*b*, 302*a*, and 302*b* formed on rotatable rods 310 and 320, which are longer than the distances required for sliding handle bars 350 and 360 vertically, rotatable rods 310 and 320 are also long. As described above, the length of rotatable rods 310 and 320 increases the weight of carrier 1000, requiring more efforts to pick up or move carrier 1000.

The present invention provides a carrier having foldable wheels for reducing weight thereof and for increasing portability thereof by shortening the length of rotatable rods.

In addition, the present invention provides a carrier having foldable wheels with an increase in the wheel's diameter to easily and smoothly move the carrier over uneven surfaces.

In addition, the present invention provides a carrier that has foldable wheels to be conveniently use and store.

Additional aspects of the present disclosure will be set forth in the description that follows and, in part, will be obvious from the description or may be learned by practice of the present disclosure.

SUMMARY

One aspect of the present invention provides a device for turning rotatable rods for folding or unfolding wheels of a carrier including: a pair of rotatable rods, each comprising one or more helical lines; a cross bar, which comprises one or more helical line coupling portions slidably coupled with the one or more helical lines on both sides and connects the pair of rotatable rods to each other; a frame or a body, on which the pair of rotatable rods are rotatably installed; and one or more elastic members, which provide restoring force to the cross bar.

The direction of the restoring force provided to the cross bar by the one or more elastic members is upward or downward.

Each of the helical lines is formed as a groove, each of the helical line coupling portions is formed as a pin, and the helical line coupling portions are correspondingly inserted into the grooves of the helical lines so that the helical line coupling portions can slide along the helical lines.

Each of the helical lines comprises an upper narrow section and a middle wide section.

Each of the helical lines protrudes and comprises convex portions, each of the helical line coupling portions comprise concave portion, and the convex portions of the helical lines are correspondingly inserted into the concave portions of the helical line coupling portions so that the helical line coupling portions can slide along the helical lines.

Each of the helical lines comprises an upper wide section and a middle narrow section.

A wheel is connected to each of the pair of rotatable rods.

The body is any one of a bag, a suitcase, a trunk, or a golf bag.

Another aspect of the present invention provides a device for turning rotatable rods for folding or unfolding wheels of a carrier including: a pair of rotatable rods, each comprising one or more helical lines; a cross bar, which comprises one or more helical line coupling portions slidably coupled with the one or more helical lines on both sides and connects the pair of rotatable rods to each other; a frame or a body on which the pair of rotatable rods are rotatably installed; and one or more handle bars separated from the cross bar and installed on the frame or the body to be vertically slidable.

The one or more handle bars can come into contact with or be separated from the cross bar due to the vertical sliding of the one or more handle bars.

The distance of vertical movement of the cross bar is shorter than the vertically slidable distance of the one or more handle bars.

The device further comprises one or more elastic members, which provide restoring force to the cross bar upward or downward.

The device further comprises one or more guide bars, which stretch from the cross bar upward or downward by certain lengths.

Each of the helical lines is formed as a groove, each of the helical line coupling portions is formed as a pin, and the helical line coupling portions are correspondingly inserted into the grooves of the helical lines so that the helical line coupling portions can slide along the helical lines.

Each of the helical lines comprises an upper narrow section and a middle wide section.

Each of the helical lines protrudes and comprises convex portions, each of the helical line coupling portions comprises concave portion, and the convex portions of the helical lines are correspondingly inserted into the concave portions of the helical line coupling portions so that the helical line coupling portions can slide along the helical lines.

Each of the helical lines comprises an upper wide section and a middle narrow section.

A wheel is connected to each of the pair of rotatable rods.

The body is any one of a bag, a suitcase, a trunk, or a golf bag.

Since it is possible to decrease the length of the rotatable rods and to reduce the weight of the carrier, durability thereof may be increased and portability thereof may be improved.

Since it is possible to increase the diameter of the wheels, wheels may roll easily and smoothly even on a moderately uneven surfaces.

Since it is possible to fold the wheels, the carrier can be used and stored conveniently.

BRIEF DISCRIPTION OF THE DRAWINGS

DETAILED DESCRIPTION

Figure 1:
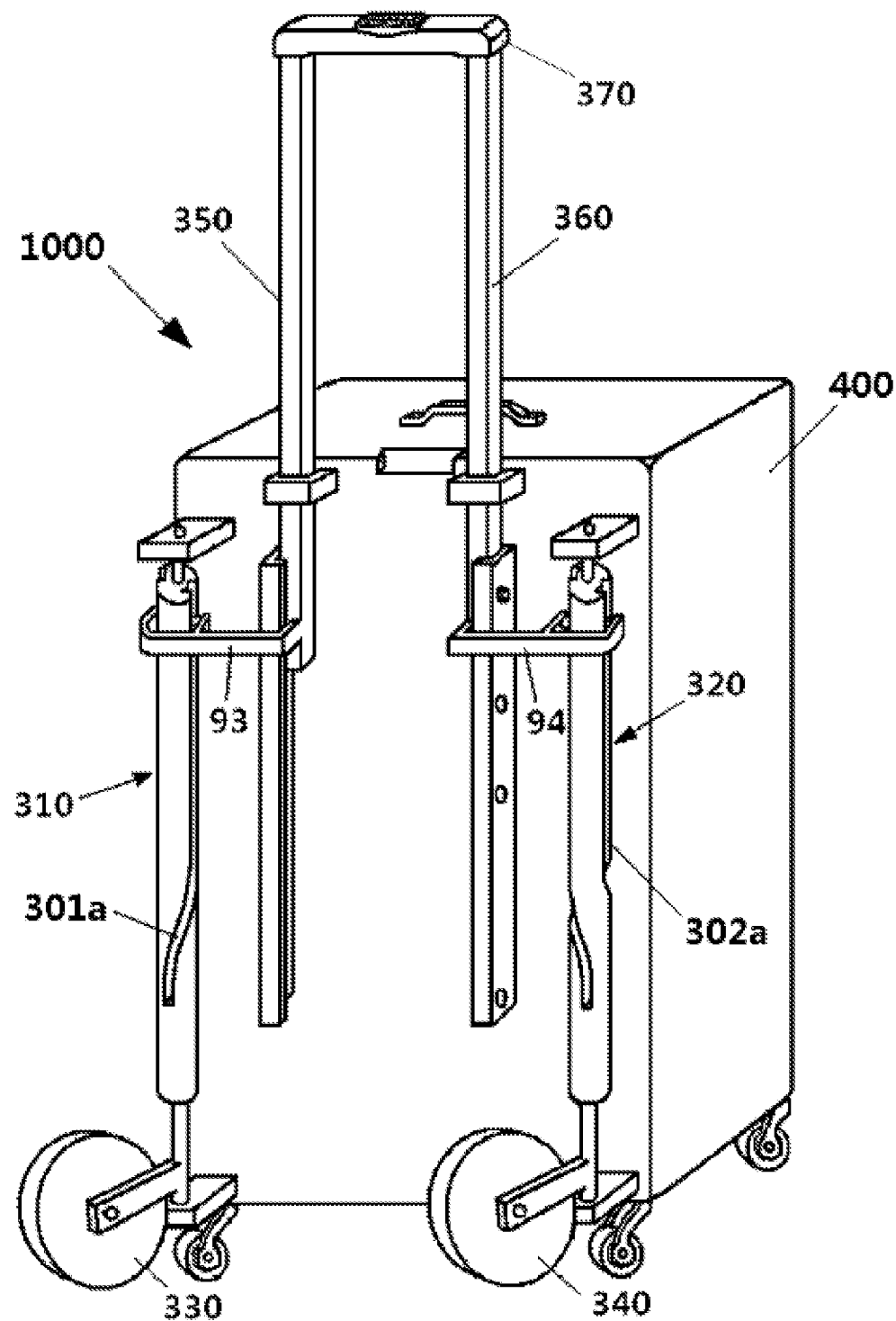
FIG. 1 is a schematic perspective view of a carrier implemented according to the previously registered patent filed by the present applicant.

The present invention relates to a carrier having foldable wheels, particularly, to a device for turning rotatable rods for folding or unfolding wheels of a carrier.

Hereinafter, embodiments of the present invention will be described in detail with reference to the attached drawings.

Throughout the drawings, like elements will be referred to as like reference numerals.

Throughout the specification, when it is stated that one portion is connected to other portion, it may include not only a case of being directly connected but also a case of being indirectly connected with another element therebetween.

Singular expressions, unless contextually otherwise defined, include plural expressions.

The present invention may be embodied in several various forms and is not limited to the embodiments described below.

A device for turning rotatable rods for folding wheels of a carrier according to embodiments of the present invention may be generally applied to luggage, a luggage cart, and a hand truck, but is not limited thereto.

Carriers 1100, 1300, 1400, 1500, 1600, 1700, and 1800 according to embodiments of the present invention are in the form of luggage, but the present invention is not limited thereto.

Carrier 1200 implemented according to an embodiment of the present invention is in the form of a luggage cart or a hand truck, but the present invention is not limited thereto.

Bodies 410, 430, 440, and 450 of carriers 1100, 1400, 1500, 1600, 1700, and 1800 implemented according to the embodiments of the present invention may be any one of a bag, a suitcase, a trunk, or a golf bag, but the present invention is not necessarily limited thereto.

Helical lines 10a, 10b, 11a, 11b, 12a, 12b, 13a, 13b, 14a, 14b, 15a, 15b, 16a, 16b, 17a, and 17b in the carriers 1100, 1200, 1300, 1400, 1500, 1600, and 1700 are formed as grooves.

The shapes of helical lines 10a, 10b, 11a, 11b, 12a, 12b, 13a, 13b, 14a, 14b, 15a, 15b, 16a, 16b, 17a, and 17b are merely examples, and the present invention is not limited thereto.

Helical lines 18a, 18b, 19a, and 19b included in rotatable rods 190A and 190B of carrier 1800 are formed protruding.

The shapes of helical lines 18a, 18b, 19a, and 19b are merely examples, and the present invention is not limited thereto.

One or more elastic members 31 and 32 in carriers 1100, 1200, 1300, 1400, 1600, and 1800 implemented according to the embodiments of the present invention move cross bars 1, 2, 2', 4, and 8 in one direction.

One or more elastic members 35 included in carrier 1500 move cross bar 1 in one direction.

One or more elastic members 92 included in carrier 1700 move cross bar 6 in one direction.

Figure 3:
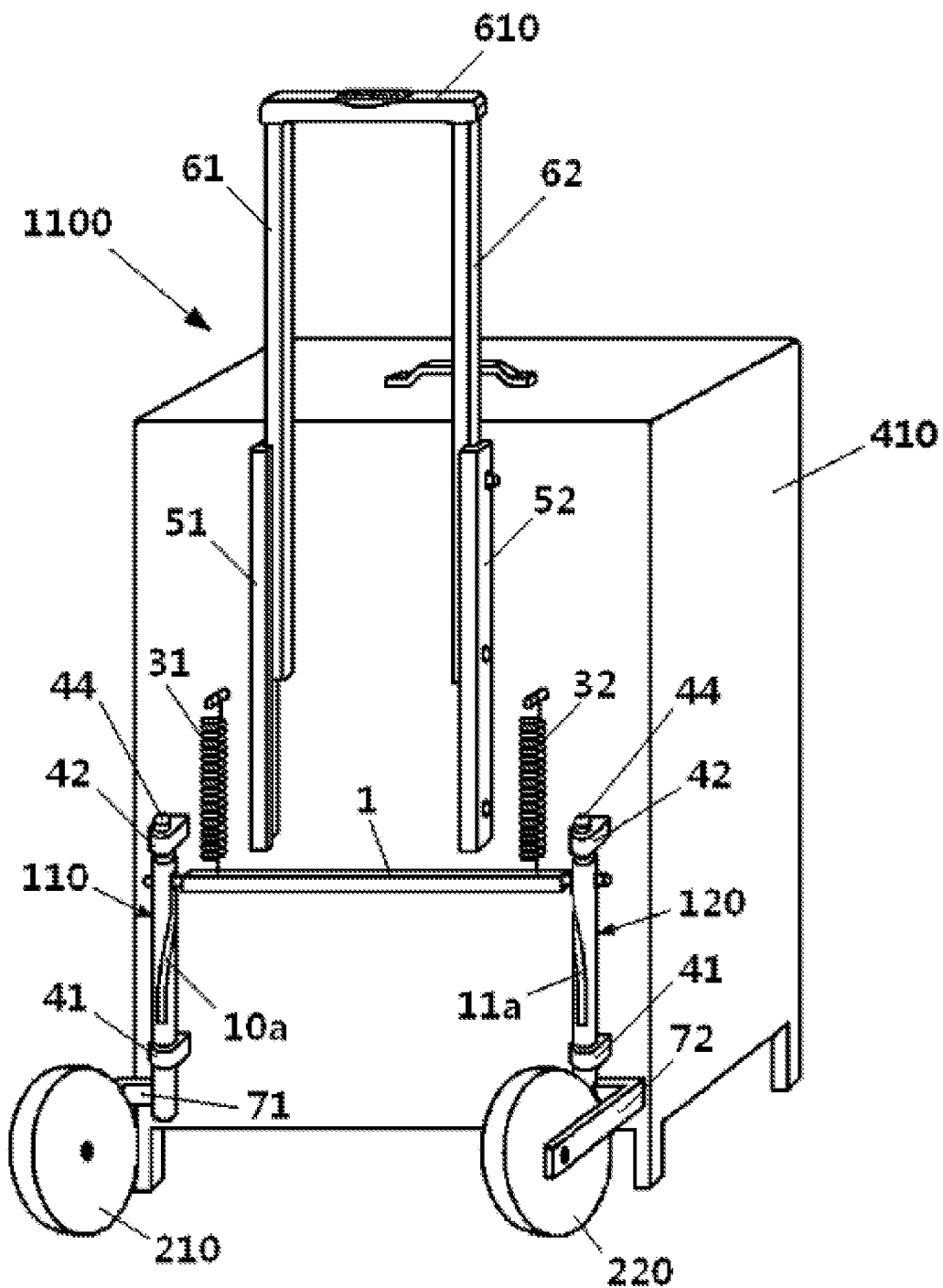
FIG. 3 is a schematic perspective view of a carrier implemented according to one embodiment of the present invention.

FIG. 3 is a schematic perspective view of carrier 1100 implemented according to a first embodiment of the present invention.

As shown in FIG. 3, a device for turning rotatable rods for folding wheels of a carrier includes rotatable rod 110 (which includes one or more helical lines 10a and 10b), rotatable rod 120 (which includes one or more helical lines 11a and 11b), helical line coupling portion 21 coupled with helical lines 10a and 10b, helical line coupling portion 22 coupled with helical lines 11a and 11b, cross bar 1 (which connects a pair of rotatable rods 110 and 120), and one or more elastic members 31 and 32 (which move the cross bar 1 in one direction). Here, body 410 may also be included to accommodate objects. Since body 410 is shown to illustrate a method for using carrier 1100, body 410 may be omitted as necessary.

In addition, as necessary, the device for turning rotatable rods of wheels of the carrier may further include other components.

As shown in FIG. 3, a pair of rotatable rods 110 and 120 are installed on body 410.

Rotatable rods 110 and 120 may be installed on body 410 to be parallel to each other or substantially parallel to each other with certain distances to left and right, with a longitudinal direction as the vertical direction.

Figure 9:
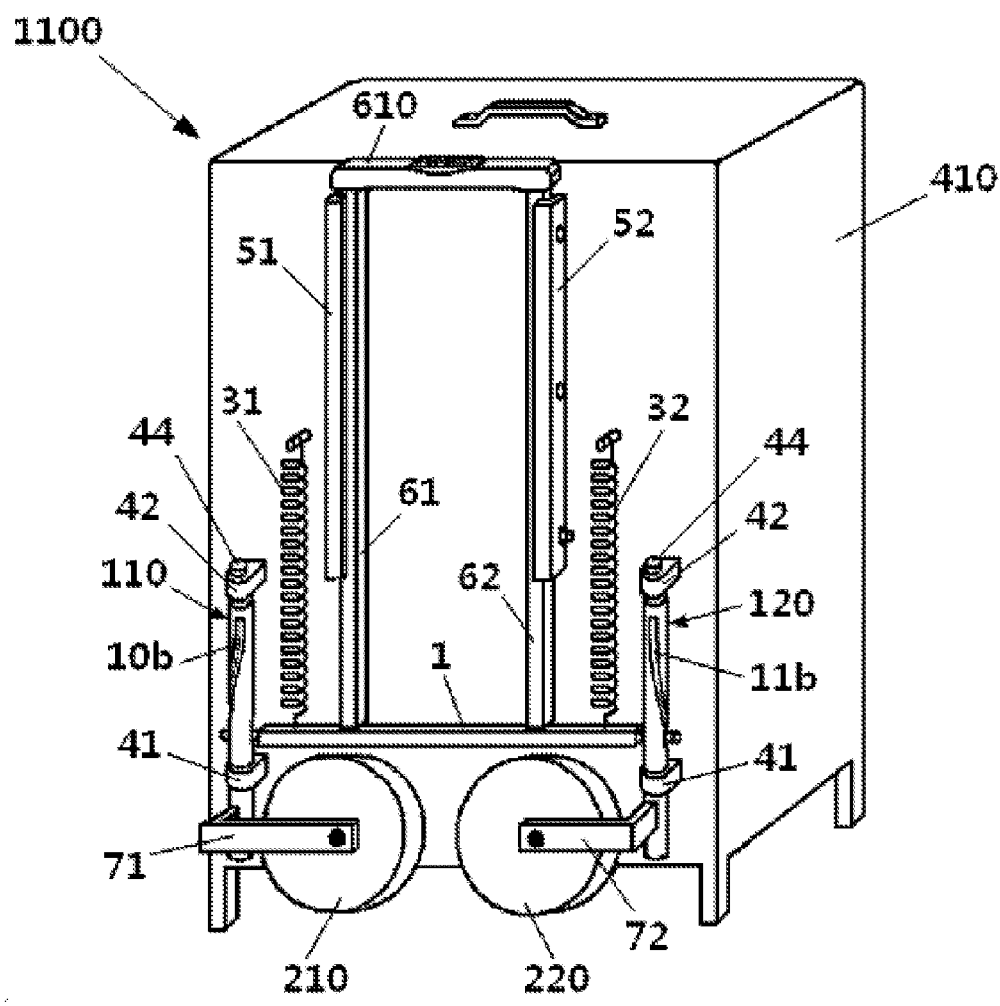
FIG. 9 is a schematic diagram illustrating an operational state of the carrier of FIG. 3.

Rotatable rod 110 includes a pair of helical lines 10a and 10b at a rod with a certain length, and rotatable rod 120 includes a pair of helical lines 11a and 11b at a rod with a certain length (refer to FIG. 9). Rotatable rods 110 and 120 may have one or more, preferably two, helical lines, as shown in FIGS. 3 and 9.

Helical lines 10a, 10b, 11a, and 11b are formed as grooves with a certain depth. The shapes of helical lines 10a, 10b, 11a, and 11b are merely examples, and the present invention is not limited thereto. Tops or bottoms of helical lines 10a, 10b, 11a, and 11b may extend as straight lines with certain lengths in a longitudinal direction of rotatable rods 110 and 120, or all of them may extend as straight lines with certain lengths in the longitudinal direction of rotatable rods 110 and 120, but are not limited thereto.

The pair of helical lines 10a and 10b included in rotatable rod 110 and the pair of helical lines 11a and 11b included in rotatable rod 120 are symmetrical. The pair of helical lines 10a and 10b and the pair of helical lines 11a and 11b may be precisely symmetrical but are not limited thereto.

As shown in FIGS. 4(a) and 4(b), some portions 43 and some portions 44 of rotatable rods 110 and 120 are thinner than other portions. The shapes of rotatable rod 110 of FIG. 4(a) and rotatable rod 120 of FIG. 4(b) are merely examples, and the present invention is not limited thereto.

Figure 4:
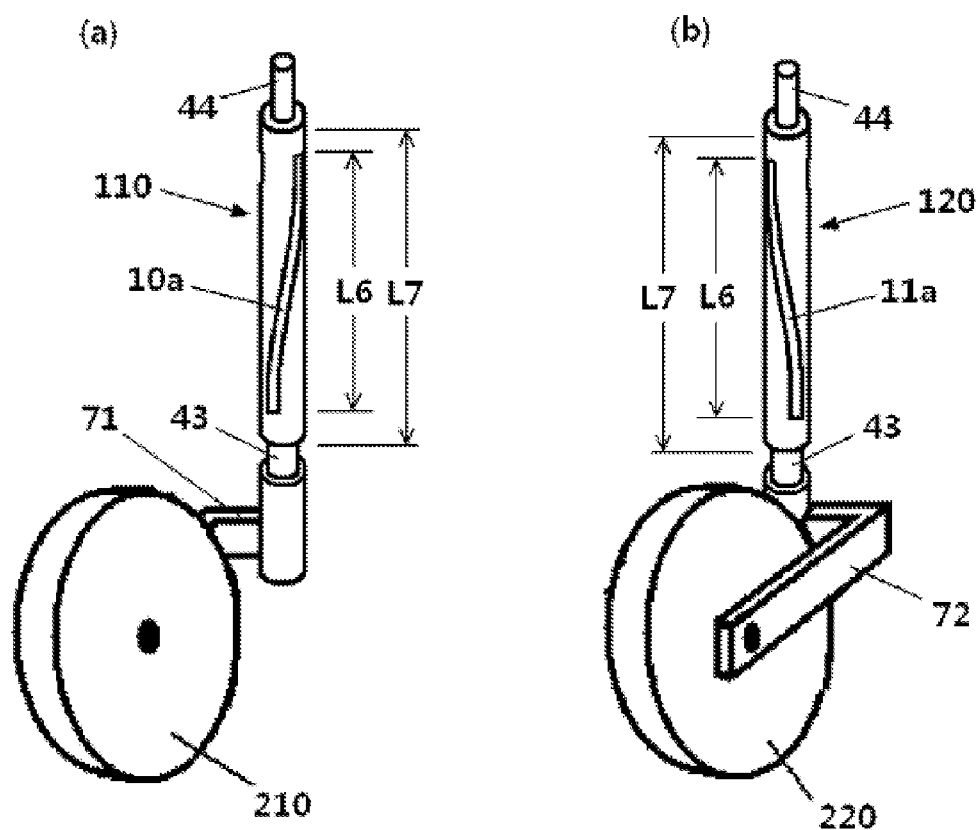
FIG. 4 is a schematic perspective view of the rotatable rods included in the carrier of FIG. 3 and the wheels installed thereon by being connected thereto.

A method for installing rotatable rods 110 and 120 of FIG. 4 on body 410 may include positioning certain portions 44 of rotatable rods 110 and 120 at sleeve 42 installed on body 410 and positioning other portions 43 at sleeve 41, but the present invention is not limited thereto.

Wheel supporters 71 and 72 may be provided at rotatable rods 110 and 120, respectively. Wheels 210 and 220 may be connected to and installed on rotatable rods 110 and 120, respectively. A method for installing wheels 210 and 220 on rotatable rods 110 and 120 may include installing wheel 210 on wheel supporter 71 (which is included in rotatable rod 110) and installing wheel 220 on wheel supporter 72 (which is included in rotatable rod 120). In addition, wheels 210 and 220 may be directly installed on rotatable rods 110 and 120, respectively, without wheel supporters 71 and 72. As rotatable rods 110 and 120 turn in longitudinal directions thereof by certain angles, wheels 210 and 220 connected to and installed on rotatable rods 110 and 120, respectively, also turn by certain angles.

FIG. 5(a) is a schematic perspective view of cross bar 1 included in carrier 1100 of FIG. 3. Cross bar 1 includes helical line coupling portion 21 on the left and helical line coupling portion 22 on the right. Helical line coupling portions 21 and 22 included in cross bar 1 are formed in pin shapes. The shapes of helical line coupling portions 21 and 22 are merely examples, and the present invention is not limited thereto.

As shown in FIG. 3, rotatable rod 110 and rotatable rod 120 are connected by cross bar 1. Helical line coupling portion 21 passes through, is inserted into, and is coupled with helical lines 10a and 10b. Similarly, helical line coupling portion 22 passes through, is inserted into, and is coupled with helical lines 11a and 11b, thereby allowing cross bar 1 to be installed and connect rotatable rod 110 and rotatable rod 120.

Helical line coupling portion 21 vertically slides along helical lines 10a and 10b, and helical line coupling portion 22 vertically slides along helical lines 11a and 11b as cross bar 1 moves up or moves down, thereby allowing rotatable rod 110 and rotatable rod 120 to turn in longitudinal directions by certain angles clockwise or counterclockwise. As described above, since the pair of helical lines 10a and 10b included in rotatable rod 110 and the pair of helical lines 11a and 11b included in rotatable rod 120 are symmetrical, rotatable rod 110 and rotatable rod 120 turn in opposite longitudinal directions as cross bar 1 moves up or down.

Instead of the cross bar of FIG. 5(a), cross bars with other shapes, such as cross bar 2 shown in FIG. 5(b) or cross bar 2' shown in FIG. 5(c), may be installed. (Refer to FIG. 12)

Cross bar 2 of FIG. 5(b) includes one or more helical line coupling portions 23a and 23b on the left thereof and connected by connection portion 25, and similarly includes one or more helical line coupling portions 24a and 24b on the right thereof and connected by a connection portion 26. Helical line coupling portions 23a, 23b, 24a, and 24b included in cross bar 2 are formed in pin shapes. The shapes of helical line coupling portions 23a, 23b, 24a, and 24b are merely examples, and the present invention is not limited thereto.

A pair of helical line coupling portions 23a and 23b provided on the left of cross bar 2 of FIG. 5(b) face each other with end portions spaced apart by a certain distance. Similarly, a plurality of such helical line coupling portions 24a and 24b on the right also face each other with end portions spaced apart by a certain distance. Helical line coupling portions 23a and 23b and helical line coupling portions 24a and 24b having the shapes described above may be applied to various cases regardless of whether helical lines 10a and 10b of rotatable rod 110 penetrate each other and helical lines 11a and 11b of rotatable rod 120 penetrate each other.

Helical line coupling portions 21 and 22 of cross bar 1 of FIG. 5(a) and helical line coupling portions 27 and 28 of cross bar 2' of FIG. 5(c) are insertable when rotatable rod 110 is penetrated by helical lines 10a and 10b and rotatable rod 120 is penetrated by helical lines 11a and 11b.

One helical line coupling portion 23b of helical line coupling portions 23a and 23b on the left of cross bar 2 of FIG. 5(b) may be inserted into helical line 10a on one side included in rotatable rod 110, and the other helical line coupling portion 23a may be inserted into helical line 10b on the other side. Similarly, one helical line coupling portion 24a of helical line coupling portions 24a and 24b on the right of cross bar 2 may be inserted into helical line 11a on one side included in rotatable rod 120, and the other helical line coupling portion 24b may be inserted into helical line 11b on the other side. (Refer to FIG. 12)

Cross bar 2' of FIG. 5(c) includes helical line coupling portion 27 on the left and helical line coupling portion 28 on the right. Both end portions of helical line coupling portion 27 are connected by connection portion 25, and similarly, both end portions of helical line coupling portion 28 are connected by connection portion 26.

As with cross bar 1 of FIG. 5(a), helical line coupling portion 27 on the left of cross bar 2' of FIG. 5(c) may penetrate and be inserted into the pair of helical lines 10a and 10b included in rotatable rod 110, and helical line coupling portion 28 on the right may penetrate and be inserted into the pair of helical lines 11a and 11b included in rotatable rod 120.

Accordingly, helical line coupling portion 27 is slidable along helical lines 10a and 10b, and similarly helical line coupling portion 28 is slidable along helical lines 11a and 11b.

Figure 5:
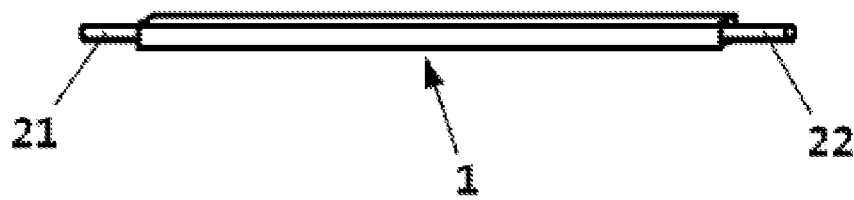
FIG. 5 is a schematic perspective view of the cross bars applicable to the carrier of FIG. 3.
Figure 5:
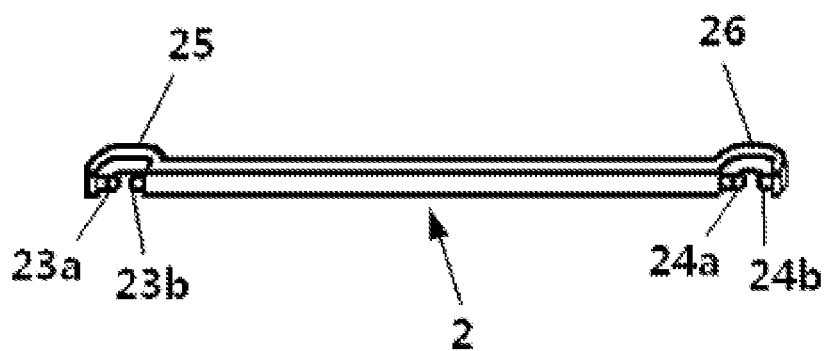
Figure 5:
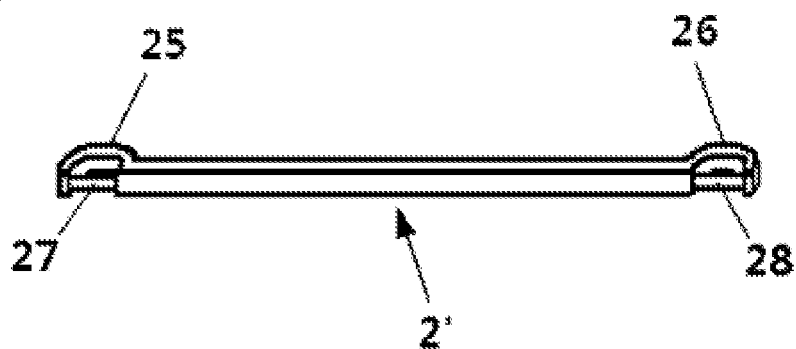

The shapes of cross bars 1, 2, and 2' of FIG. 5 are merely examples, and the present invention is not limited thereto.

The shapes of cross bars 1, 2, and 2' of FIG. 5 may be applied to carriers 1200, 1300, 1400, 1500, 1600, and 1700 according to the following embodiments.

FIGS. 6(a) and 6(b) are schematic perspective views illustrating a certain section L7 between the bottom of portion 44 and the top of portion 43 in rotatable rod 110 of FIG. 4(a) and rotatable rod 120 of FIG. 4(b).

Figure 6:
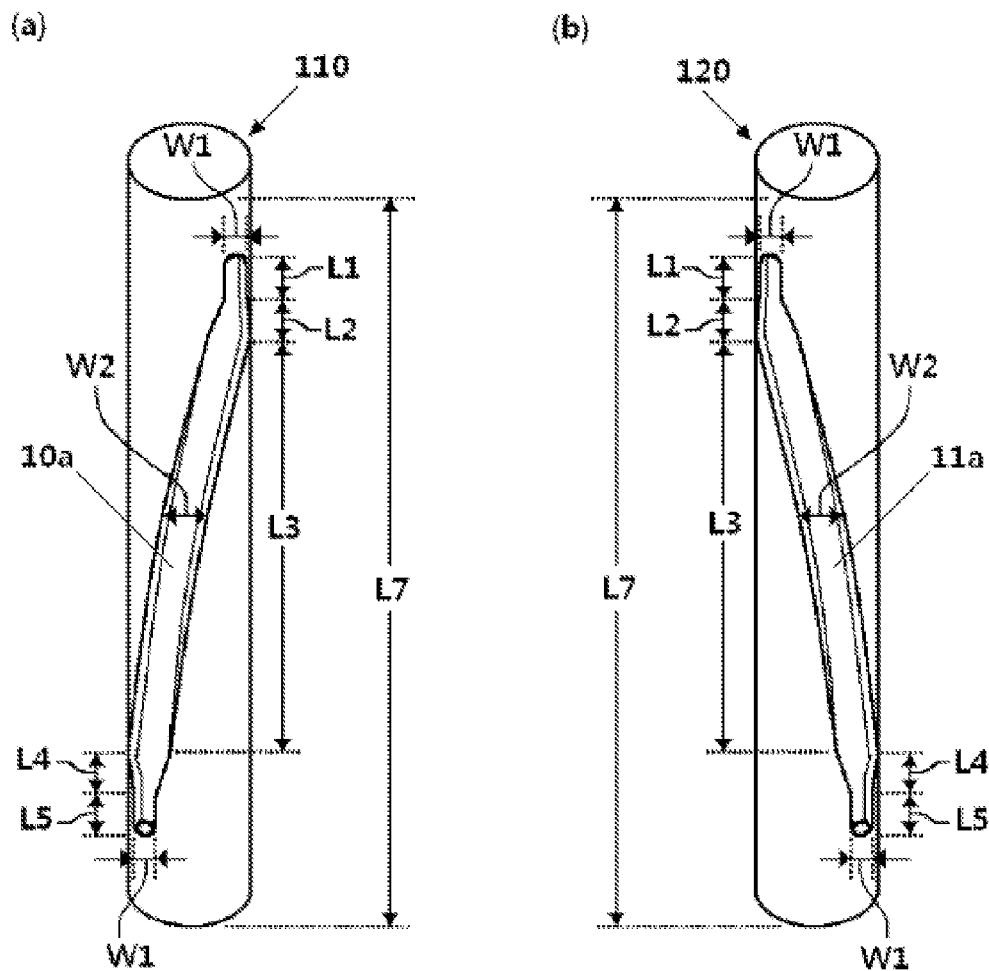
FIG. 6 is a schematic perspective view illustrating certain sections of the rotatable rods of FIG. 4.

As shown in FIG. 6, helical line 10a of rotatable rod 110 and helical line 11a of rotatable rod 120 include upper narrow section L1 and lower narrow section L5 with a small width W1. (Not shown in the drawing, helical lines 10b and 11b are also formed in structures like helical lines 10a 11a) Middle wide section L3 with a large width W2 is formed between upper narrow section L1 and lower narrow section L5. Upper narrow section L1 and middle wide section L3 are connected by upper connection section L2, and lower narrow section L5 and middle wide section L3 are connected by lower connection section L4.

Upper connection section L2 has a structure which becomes gradually broader from top to bottom, and lower connection section L4 has a structure which becomes gradually narrower from top to bottom.

Figure 7:
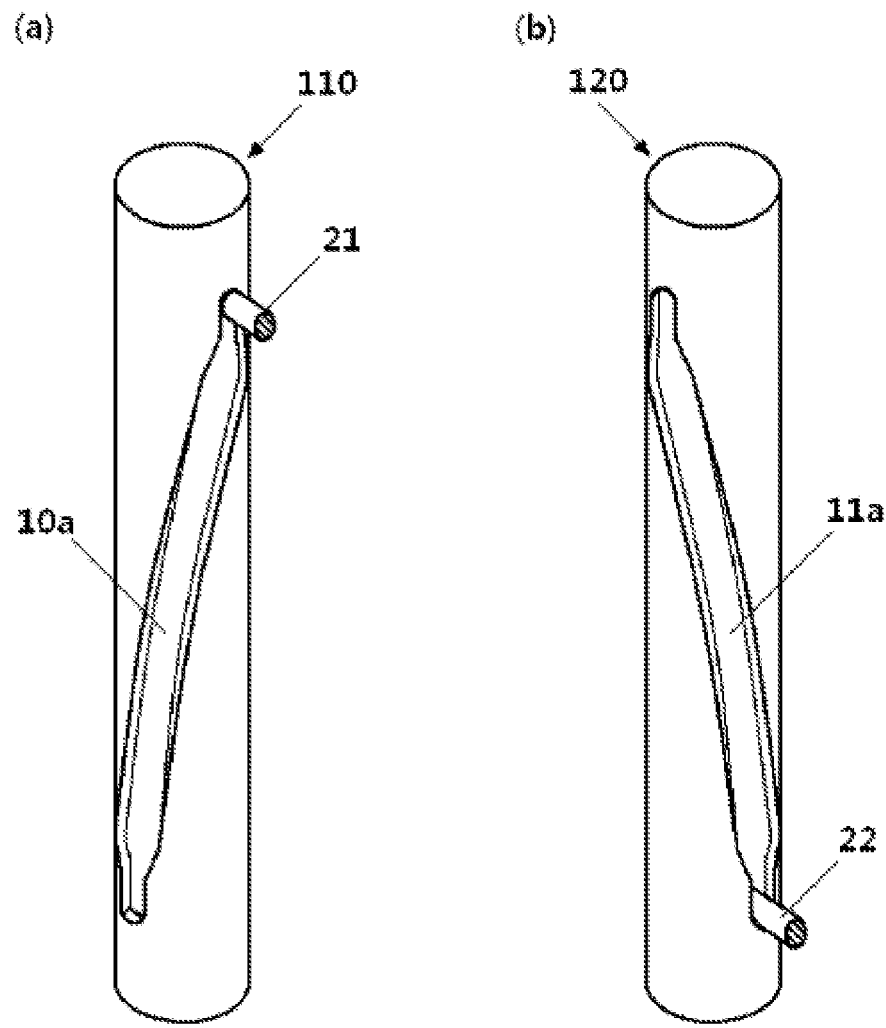
FIG. 7 is a schematic view illustrating an operational state of the rotatable rods of FIG. 6.

FIG. 7(a) illustrates a state in which one of helical line coupling portions 21, 23b, and 27 provided on the left of cross bars 1, 2, and 2' of FIG. 5 is positioned in upper narrow section L1 in rotatable rod 110 of FIG. 6(a).

FIG. 7(b) illustrates a state in which one of helical line coupling portions 22, 24a, and 28 provided on the right of cross bars 1, 2, and 2' of FIG. 5 is positioned in lower narrow section L5 in rotatable rod 120 of FIG. 6(b).

In the state shown in FIG. 7(a) or 7(b), fluctuations in the left and right rotations of rotatable rods 110 and 120 in the longitudinal directions are effectively reduced, which decreases the propensity of wheels 210 and 220 connected to and installed on rotatable rods 110 and 120, respectively, rocking unstably.

Helical line coupling portions 21, 22, 23a, 23b, 24a, 24b, 27, and 28 can slide more easily and smoothly in the vertical direction in middle wide section L3.

The difference between width W1 of the upper narrow section and width W2 of the middle wide section may be from 0.1 to 1 mm but is not limited thereto.

Through upper connection section L2 or lower connection section L4, helical line coupling portion 21 or helical line coupling portion 22 may move more easily and smoothly from middle wide section L3 to upper narrow section L1 or lower narrow section L5.

The shapes of helical lines 10a and 11a of FIGS. 6(a) and 6(b), respectively, are merely examples and the present invention is not limited thereto.

Figure 8:
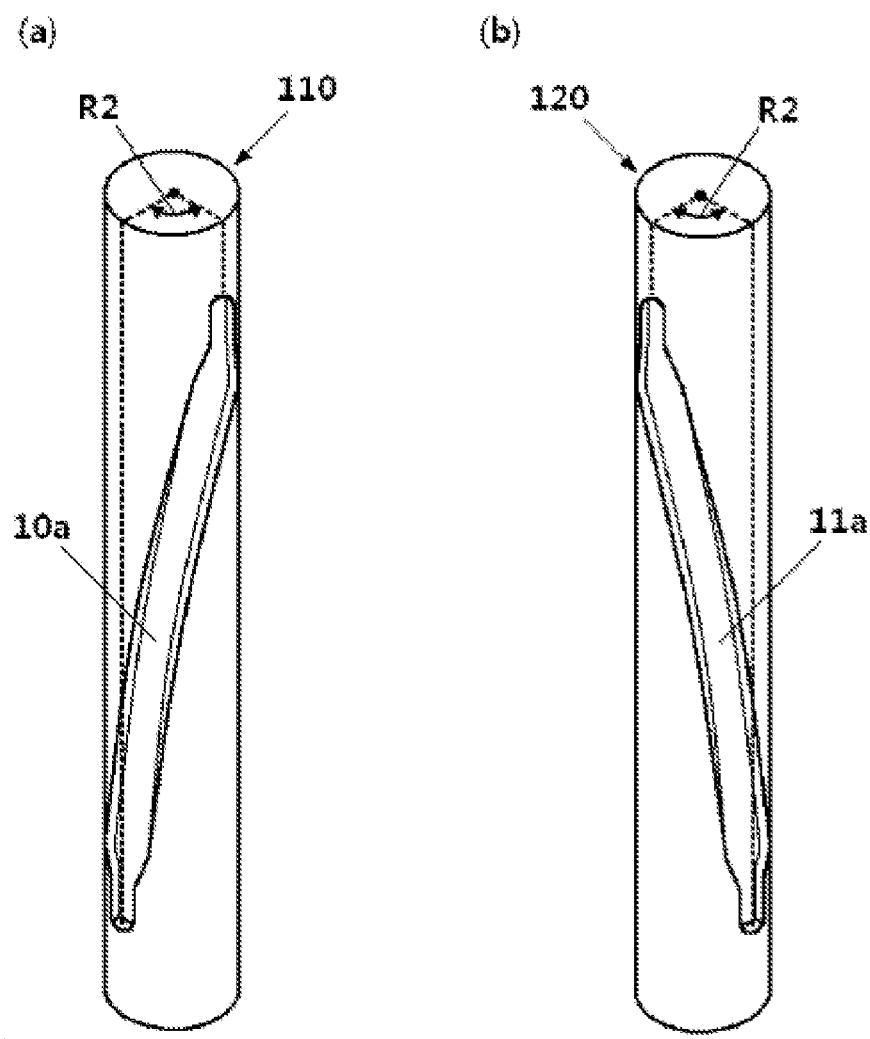
FIG. 8 is a schematic perspective view illustrating certain sections of the rotatable rods of FIG. 4.

FIGS. 8(a) and 8(b) illustrate angle R2 which is formed by the central axes of rotatable rods 110 and each of 120 upper central lines and lower central lines of helical lines 10a and 11b at rotatable rod 110 of FIG. 6(a) and rotatable rod 120 of FIG. 6(b).

When wheels 210 and 220 are unfolded toward both sides of body 410 as shown in FIG. 3 and when the wheels are folded toward the middle as shown in FIG. 9, the angles by which rotatable rods 110 and 120 turn in longitudinal directions clockwise or counterclockwise may be 90° but is not limited thereto.

As shown in FIG. 3, one or more elastic members 31 and 32 are installed while one is connected to cross bar 1 and the other is connected to body 410. Each of elastic members 31 and 32 may be a tension spring but is not limited thereto. (In FIG. 3, two elastic members 31 and 32 formed as tension springs are installed.)

One or more elastic members 31 and 32 move cross bar 1 in one direction. In FIG. 3, elastic members 31 and 32 move cross bar 1 upward by their restoring forces in such a way that cross bar 1 moves upward and wheels 210 and 220 are unfolded to both sides of body 410.

As shown in FIG. 3, one or more handle bars 61 and 62 are installed on body 410. (In FIG. 3, a pair of such handle bars 61 and 62 are installed on body 410.) The pair of handle bars 61 and 62 are vertically slidable along guide rails 51 and 52 installed on body 410.

In FIG. 3, handle 610 is lifted upward, and the pair of handle bars 61 and 62 are moved upward and fixed at those heights.

When the pair of handle bars 61 and 62 are allowed to slide down by pressing handle 610 in FIG. 3, as one or more handle bars 61 and 62 push cross bar 1 down while one or more handle bars 61 and 62 are in contact with cross bar 1, elastic members 31 and 32 stretch down, and rotatable rod 110 turns by a certain angle counterclockwise and rotatable rod 120 turns by a certain angle clockwise, thereby folding wheels 210 and 220 toward the middle. (When the pair of handle bars 61 and 62 are allowed to slide down, handle bars 61 and 62 may be in contact with cross bar 1 and may push down cross bar 1 at the same time when the lengths of handle bars 61 and 62 are identical and cross bar 1 is leveled). However, when the lengths of handle bars 61 and 62 are identical but cross bar 1 is not leveled, or when cross bar 1 is leveled left and right but the lengths of handle bars 61 and 62 are not identical, only one of the handle bars may be in contact with cross bar 1 and push it down.)

When the pair of handle bars 61 and 62 are moved upward by lifting handle 610 in FIG. 9, since one or more elastic members 31 and 32 are contracted by their restoring forces and lift up cross bar 1, as cross bar 1 moves up and rotatable rod 110 turns in the longitudinal direction by a certain angle clockwise and rotatable rod 120 turns in the longitudinal direction by a certain angle counterclockwise, wheels 210 and 220 are unfolded toward both sides of body 410, as shown in FIG. 3.

Since cross bar 1 and the pair of handle bars 61 and 62 are not formed as one but are separately formed, when the pair of handle bars 61 and 62 are continuously moved upward while cross bar 1 ascends to a certain height due to the restoring force of one or more elastic members 31 and 32 as shown in FIG. 3, the pair of handle bars 61 and 62 are separated from cross bar 1, and the distance between cross bar 1 and the pair of handle bars 61 and 62 increases.

In the structure described above, in which handle bars 61 and 62 are separable from cross bar 1, when handle 610 is raised as shown in FIG. 3 and is pushed down as shown in FIG. 9, the distance of vertical movement of cross bar 1 may become shorter than that of handle bars 61 and 62. The sections L6 of helical lines 10a, 11a, and 12b of rotatable rods 110 and 120 may become shorter (refer to FIG. 4), and the lengths of rotatable rods 110 and 120 may also become shorter. The reduction in the lengths of rotatable rods 110 and 120 decrease the weight of carrier 1100, which also improves carrier's durability.

Figure 2:
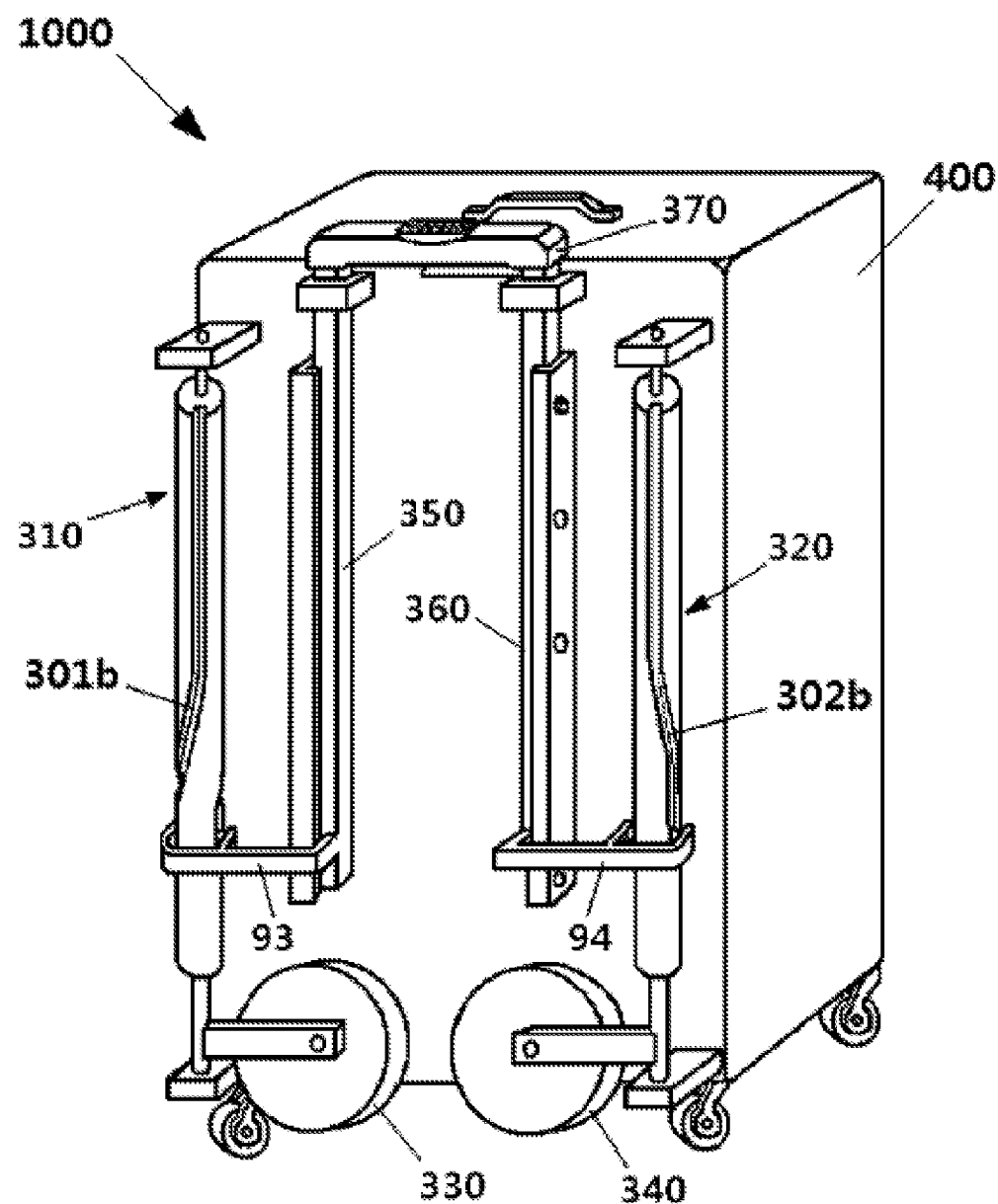
FIG. 2 is a schematic diagram illustrating an operational state of the carrier of FIG. 1.

In FIGS. 1 and 2, cross bars 93 and 94 are joined to and inseparable from handle bars 350 and 360. Since cross bars 93 and 94 must always move together with handle bars 350 and 360, the sections, in which helical lines 301a, 301b, 302a, and 302b are formed, need to be at least the same as or longer than the lengths of raising handle bars 350 and 360. Accordingly, rotatable rods 310 and 320 may be significantly long. The length of rotatable rods 310 and 320 increases the weight of carrier 1000, requiring a corresponding amount of force when it is necessary to lift and move the carrier.

When moving carrier 1100 in the state shown in FIG. 3, for example, the carrier may be dragged or pushed by gripping handle 610 and using wheels 210 and 220 while the top of the carrier is allowed to incline by a certain angle in such a way that wheels 210 and 220 are in touch with the ground.

Figure 10:
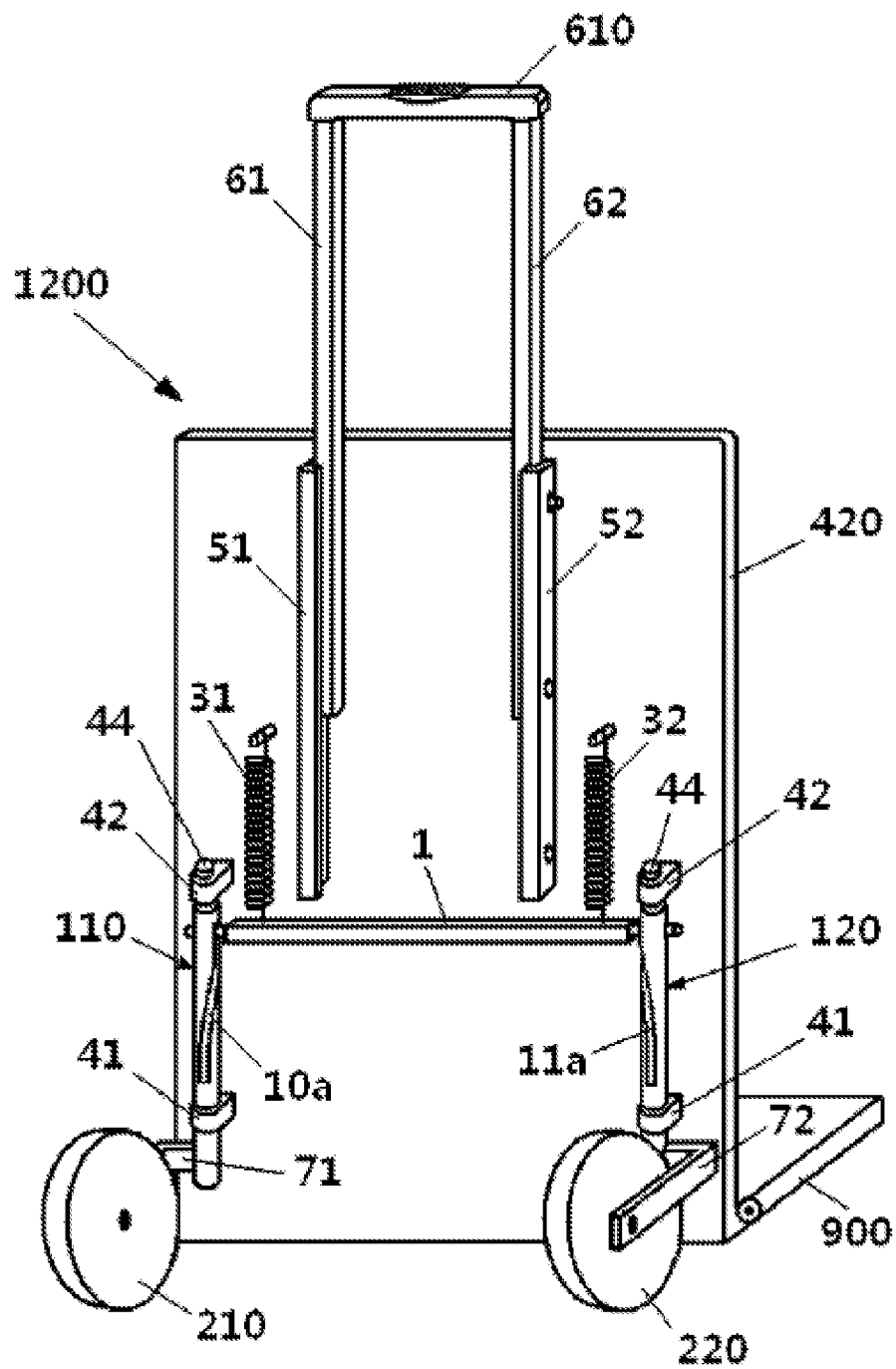
FIG. 10 is a schematic perspective view of a carrier implemented according to a second embodiment of the present invention.

FIG. 10 is a schematic perspective view of carrier 1200 implemented according to a second embodiment of the present invention. Since carrier 1200 of FIG. 10 is identical to carrier 1100 of FIG. 3 except for body 420, like reference numerals refer to like portions, and detailed description is omitted. Carrier 1200 of FIG. 10 has a shape of a luggage cart or a hand truck, but the present invention is not limited thereto. It is possible to attach or detach a bag, a suitcase, a trunk, a golf bag, etc. to or from body 420. It is also possible to hang a load on body 420 or to tie body 420 with a rope.

Figure 11:
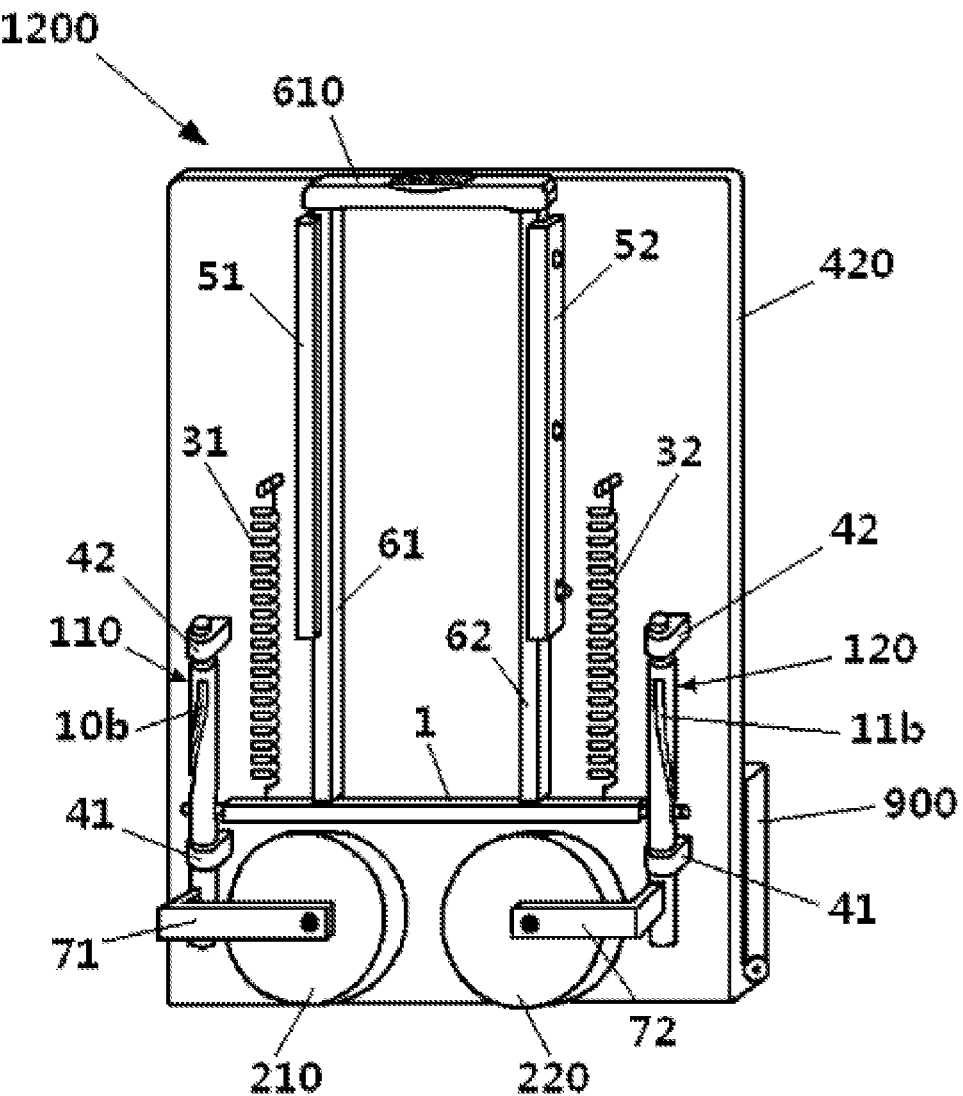
FIG. 11 is a schematic diagram illustrating an operational state of the carrier of FIG. 10.

As shown in FIG. 10, body 420 may include loading plate 900. Body 420 and loading plate 900 may be in an L shape or loading plate 900 may be folded toward body 420 as shown in FIG. 11.

Folding handle 610, wheels 210 and 220, and loading plate 900 occupies less space, which makes carrier 1200 more convenient to store.

Figure 12:
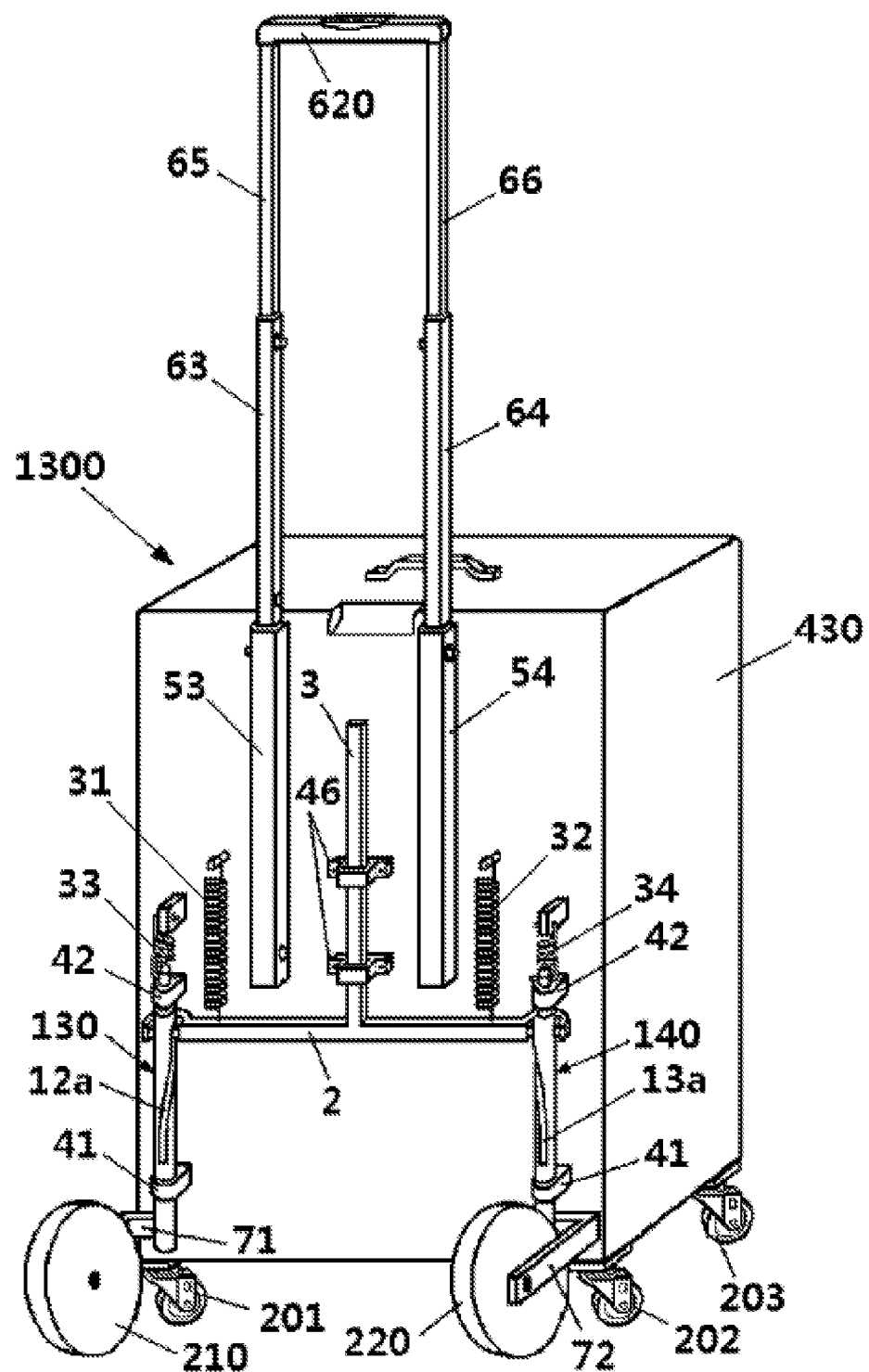
FIG. 12 is a schematic perspective view of a carrier implemented according to a third embodiment of the present invention.

FIG. 12 is a schematic perspective view of carrier 1300 implemented according to a third embodiment of the present invention.

Since carrier 1300 of FIG. 12 is similar to carrier 1100 of FIG. 3, like reference numerals refer to like elements, and detailed description is omitted.

As shown in FIG. 12, one or more handle bars 63 and 64 and handle bar extending portions 65 and 66 are connected in a telescopic method, becoming doubly foldable. Other handle bar extending portions may be added to handle bar extending portions 65 and 66 to be connected by a telescopic method, thereby allowing handle bars 63 and 64 and the handle bar extending portions to be triply or more foldable.

As shown in FIG. 12, rotatable rod 140, wheel 220, and elastic member 34 shown in FIG. 13(a) are installed on one side of body 430.

Figure 13:
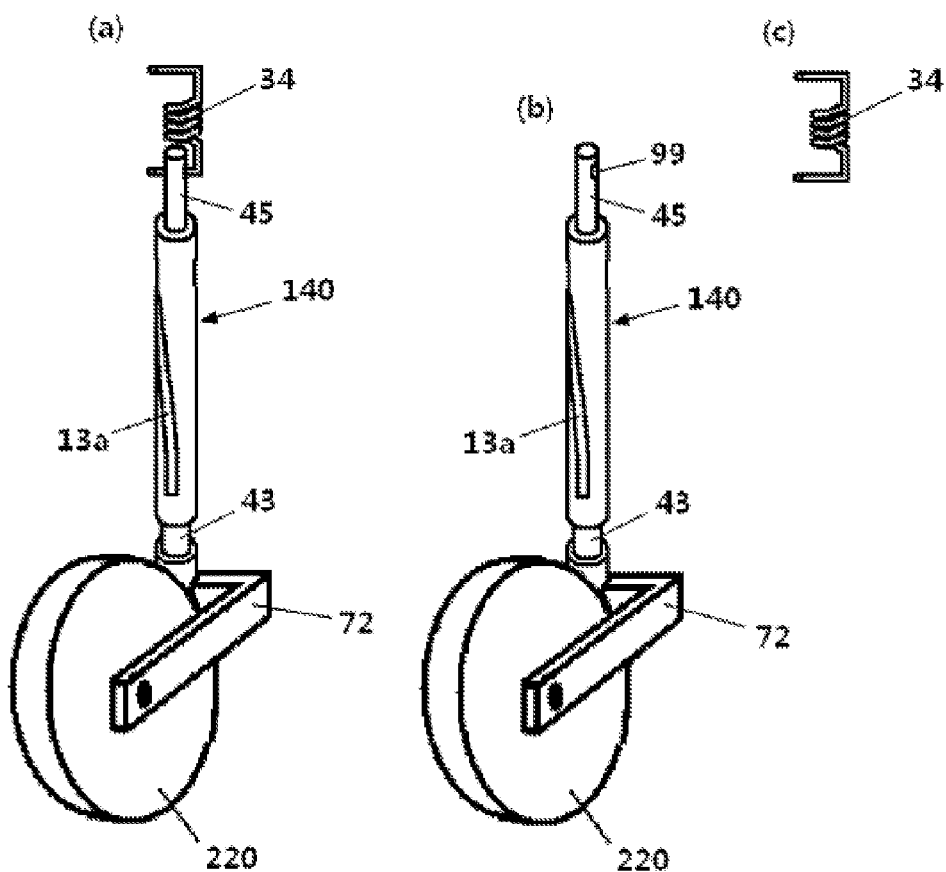
FIG. 13 is a schematic perspective view of the rotatable rods included in the carrier of FIG. 12 and the wheels and elastic members installed thereon by being connected thereto.

Rotatable rod 140 of FIG. 13(a) has a shape similar to that of rotatable rod 120 of FIG. 4(b). Rotatable rod 140 of FIG. 13 is also installed on one side of body 430 of FIG. 12 in the same way that rotatable rod 120 of FIG. 4(b) is installed on body 410 of FIG. 3. Similarly, rotatable rod 130 is installed on the other side of body 430.

The shape of rotatable rod 140, 2 of FIG. 13(b) is merely an example, and the present invention is not limited thereto.

In carrier 1300 of FIG. 12, one side of elastic member 34 shown in FIG. 13(c) is inserted into hole 99 formed at portion 45 of rotatable rod 140 of FIG. 13(b), thereby connecting rotatable rod 140 with one side of elastic member 34 as shown in FIG. 13(a) and connecting the other side of elastic member 34 with body 430. Similarly, one side of elastic member 33 is connected to rotatable rod 130, and the other side is connected to body 430. Elastic members 33 and 34 may be coil-shaped torsion springs but are not limited thereto. One or more elastic members 33 and 34 may be positioned above rotatable rods 130 and 140 as shown in FIG. 12 but are not limited thereto. When elastic members 33 and 34 are positioned above rotatable rods 130 and 140 as shown in FIG. 12, elastic members 33 and 34 may perform torsion function more freely and easily without being interfered by rotatable rods 130 and 140.

Elastic members 33 and 34 may allow rotatable rods 130 and 140 to turn by certain angles in longitudinal directions due to their restoring forces; or elastic members 33 and 34 may move cross bar 2 upward by a certain length due to the screw function when rotatable rods 130 and 140 turn as such.

Figure 14:
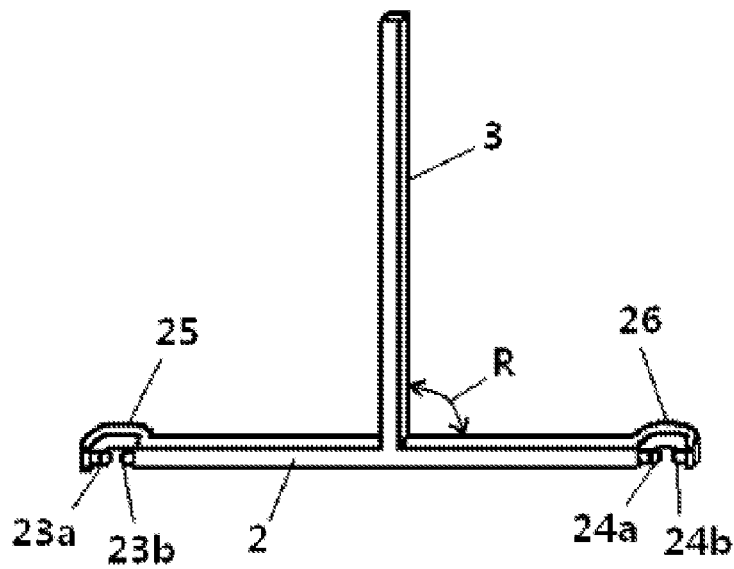
FIG. 14 is a schematic perspective view illustrating the cross bar included in the carrier of FIG. 12 and the guide bar integrated therewith.

FIG. 14 is a schematic perspective view illustrating cross bar 2 included in carrier 1300 of FIG. 12 and guide bar 3 integrated therewith.

Figure 30:
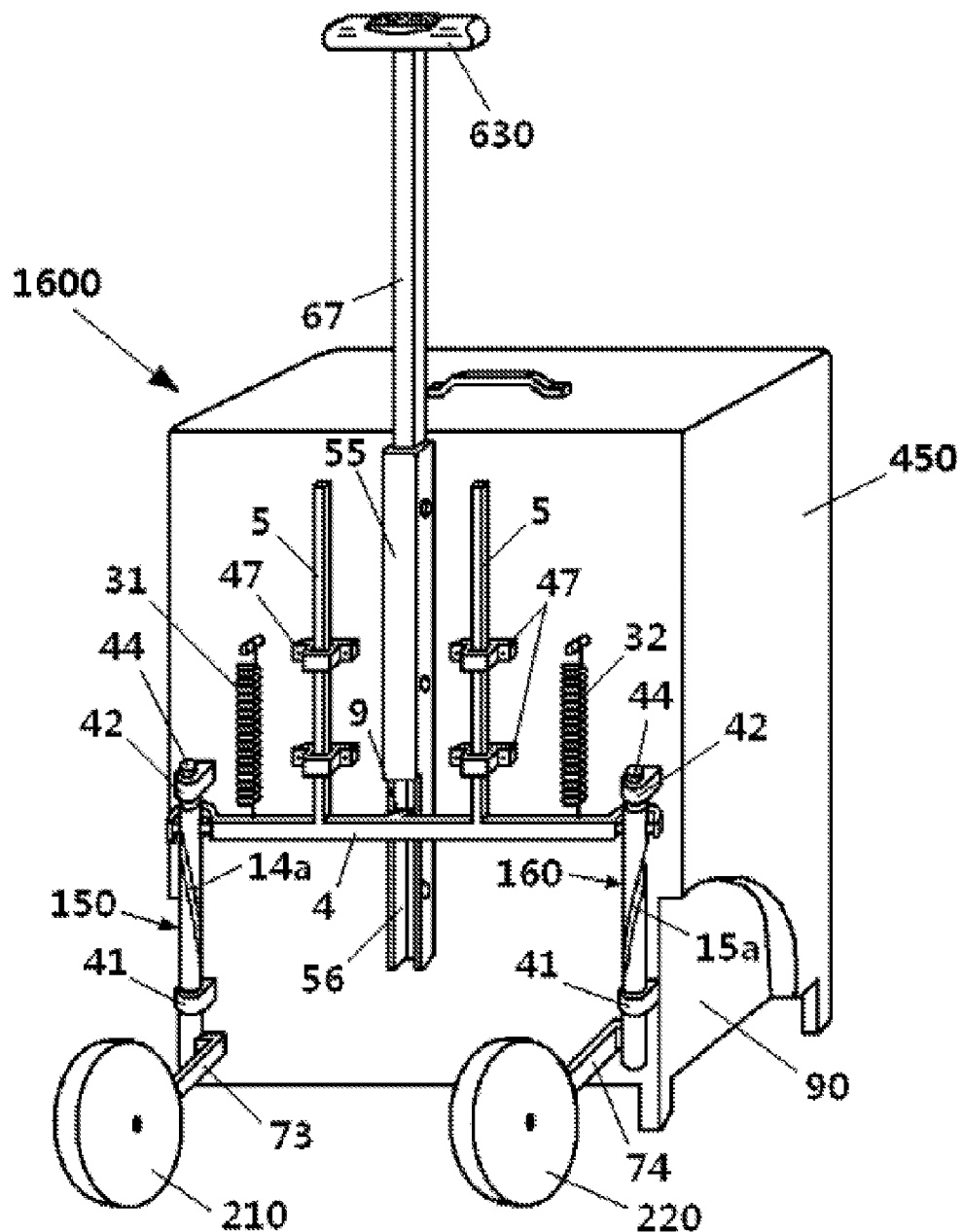
FIG. 30 is a schematic perspective view of a carrier implemented according to a sixth embodiment of the present invention.

Cross bar 2 of FIG. 14 has the same structure as that of cross bar 2 of FIG. 5(b), and guide bar 3 intersects cross bar 2 and stretches upward by a certain length. Although not shown in the drawing, if necessary, guide bar 3 may intersect cross bar 2 and stretch downward by a certain length. Also, the number of guide bars 3 joined as one to cross bar 2 may be one or more, as shown in FIG. 30.

Angle R between guide bar 3 and cross bar 2 may be 90° but is not limited thereto.

Rotatable rod 130 includes one or more helical lines 12a and 12b, and rotatable rod 140 includes one or more helical lines 13a and 13b. (It is shown in the drawing that rotatable rod 130 and rotatable rod 140 include two helical lines each.) (Refer to FIG. 15) Helical lines 12a, 12b, 13a, and 13b are formed as grooves with certain depths.

As cross bar 1 is connected to and installed between rotatable rod 110 and rotatable rod 120 in FIG. 3, cross bar 2 is connected to and installed between rotatable rod 130 and rotatable rod 140 in FIG. 12.

One helical line coupling portion 23b of helical line coupling portions 23a and 23b on the left of cross bar 2 may be inserted into helical line 12a on one side included in rotatable rod 130, and the other helical line coupling portion 23a may be inserted into helical line 12b on the other side. Similarly, one helical line coupling portion 24a of helical line coupling portions 24a and 24b on the right of cross bar 2 is inserted into helical line 13a on one side included in rotatable rod 140 and the other helical line coupling portion 24b is inserted into helical line 13b on the other side.

Accordingly, the pair of helical line coupling portions 23a and 23b on the left of cross bar 2 are coupled with a pair of such helical lines 12a and 12b included in rotatable rod 130, and a pair of such helical line coupling portions 24a and 24b on the right of cross bar 2 are coupled with a pair of such helical lines 13a and 13b included in rotatable rod 140 in such a way that cross bar 2 is installed by connecting rotatable rod 130 and rotatable rod 140.

Accordingly, helical line coupling portions 23b and 23a can slide along helical lines 12a and 12b, respectively.

Also, helical line coupling portions 24a and 24b can slide along helical lines 13a and 13b, respectively.

Also, guide bar 3 joined as one to cross bar 2 can slide vertically through one or more sleeves 46 installed on body 430.

As cross bar 2 moves vertically, helical line coupling portions 23a and 23b on the left and helical line coupling portions 24a and 24b on the right slide vertically along helical lines 12a and 12b and helical lines 13a and 13b simultaneously, in such a way that rotatable rods 130 and 140 may turn in longitudinal directions clockwise or counterclockwise by certain angles. When cross bar 2 moves vertically, guide bar 3 slides vertically through sleeves 46, thereby allowing cross bar 2 to move vertically while being horizontal or close to horizontal. Also, cross bar 2 is prevented from rolling forward and backward in longitudinal direction, allowing cross bar 2 to be more stable with smooth vertical movements.

One or more elastic members 31 and 32 move cross bar 2 in one direction. In FIG. 12, one or more elastic members 31 and 32 move cross bar 2 upward, thereby allowing cross bar 2 to be on top.

Figure 15:
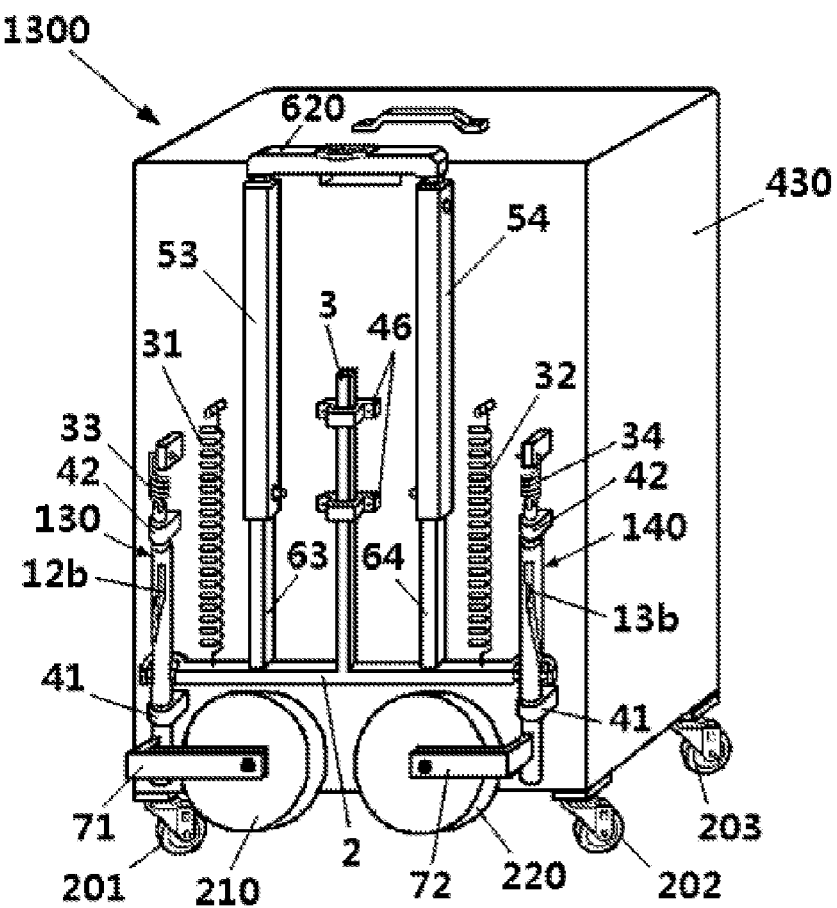
FIG. 15 is a schematic diagram illustrating an operational state of the carrier of FIG. 12.

For example, when handle 620 is pushed to move handle bars 63 and 64 downward in FIG. 12, one or more of handle bars 63 and 64 come in contact with cross bar 2 and pushes cross bar 2 downward in such a way that elastic members 31 and 32 stretch downward by certain lengths, as shown in FIG. 15. Also, rotatable rods 130 and 140 turn counterclockwise and clockwise, respectively, by certain angles in such a way that wheels 210 and 220 are folded toward the middle and elastic members 33 and 34 are distorted by certain angles.

When handle 620 is raised and handle bars 63 and 64 are moved upward in FIG. 15, due to the restoring forces of elastic members 31, 32, 33, and 34, as shown in FIG. 12, cross bar 2 moves upward, rotatable rod 130 turns in the longitudinal direction clockwise by a certain angle, and rotatable rod 140 turns in the longitudinal direction counterclockwise by a certain angle, thereby unfolding wheels 210 and 220 toward both sides of body 430. Even though only elastic members 31 and 32 or elastic members 33 and 34 can be installed, but when elastic members 31 and 32 and elastic members 33 and 34 are installed together, the restoring forces of elastic members 31 and 32 and those of elastic members 33 and 34 function together so that cross bar 2 can move upward more easily and smoothly and also rotatable rods 130 and 140 can turn more easily and smoothly clockwise or counterclockwise by certain angles.

When moving the carrier in FIG. 12, for example, the top of carrier 1300 of FIG. 12 slightly inclines to allow wheels 210 and 220 to become in contact with the ground, and carrier 1300 may be dragged or pushed by gripping handle 620 and using wheels 210 and 220. Moreover, carrier 1300 can be pushed and moved using casters 201, 202, and 203 installed below body 430 while carrier 1300 stands.

Figure 16:
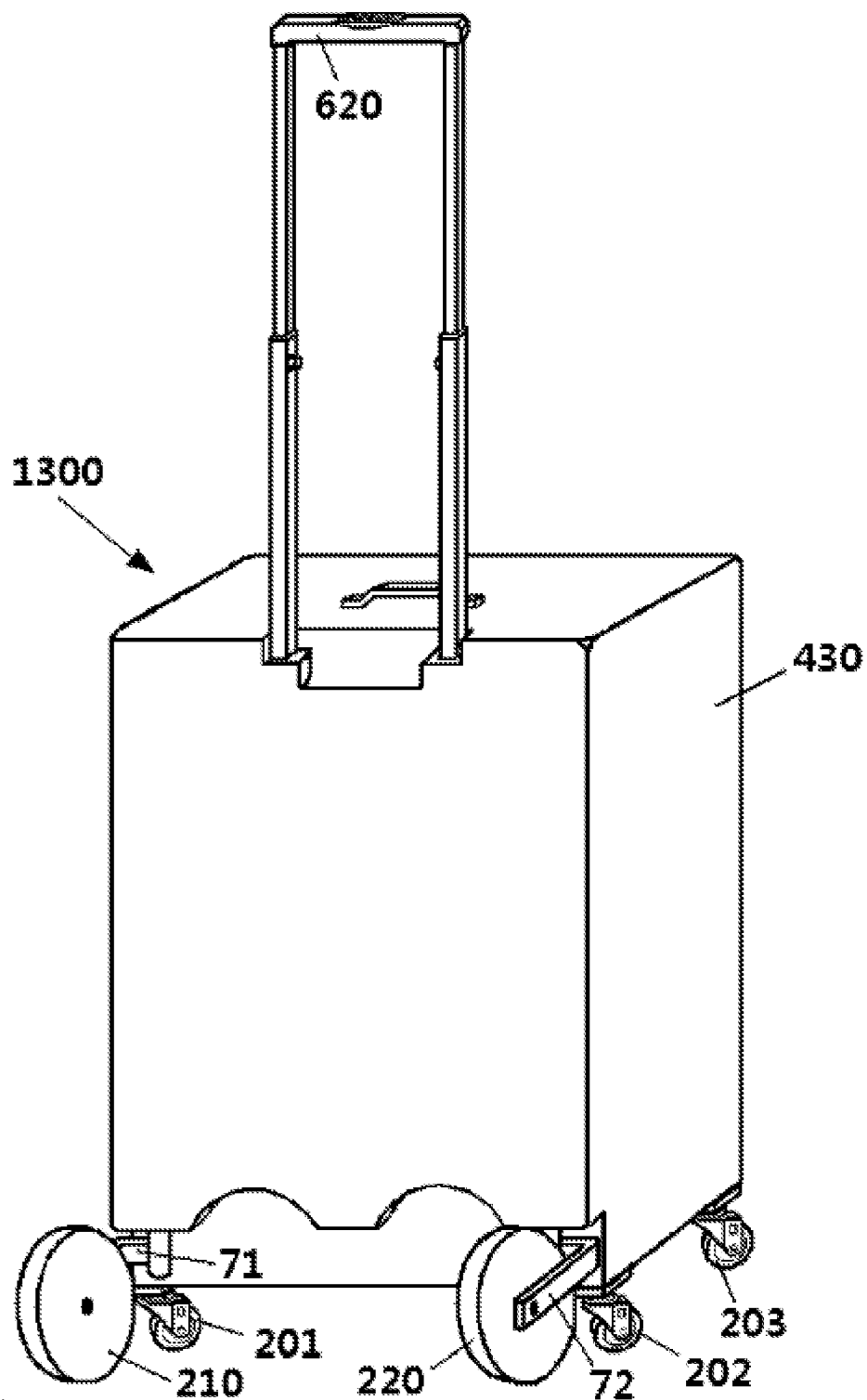
FIG. 16 is a schematic perspective view illustrating improved exterior of the carrier of FIG. 12.

FIG. 16 is a schematic perspective view illustrating a state in which elastic members 31 and 32, cross bar 2, guide bar 3, etc. installed on body 430 are hidden to improve the appearance of carrier 1300 of FIG. 12.

Figure 17:
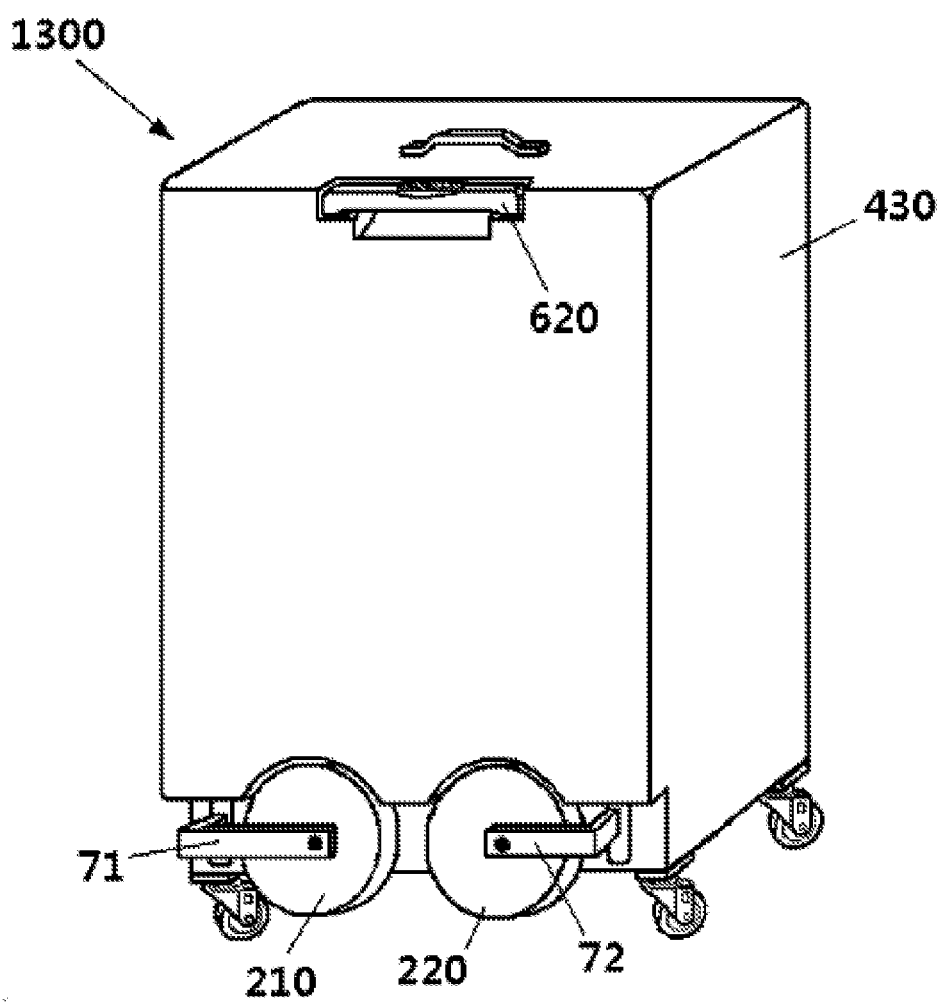
FIG. 17 is a schematic diagram illustrating an operational state of the carrier of FIG. 16.

FIG. 17 illustrates a state in which handle 620 is pushed down and wheels 210 and 220 are folded toward the middle in carrier 1300 of FIG. 16.

Figure 18:
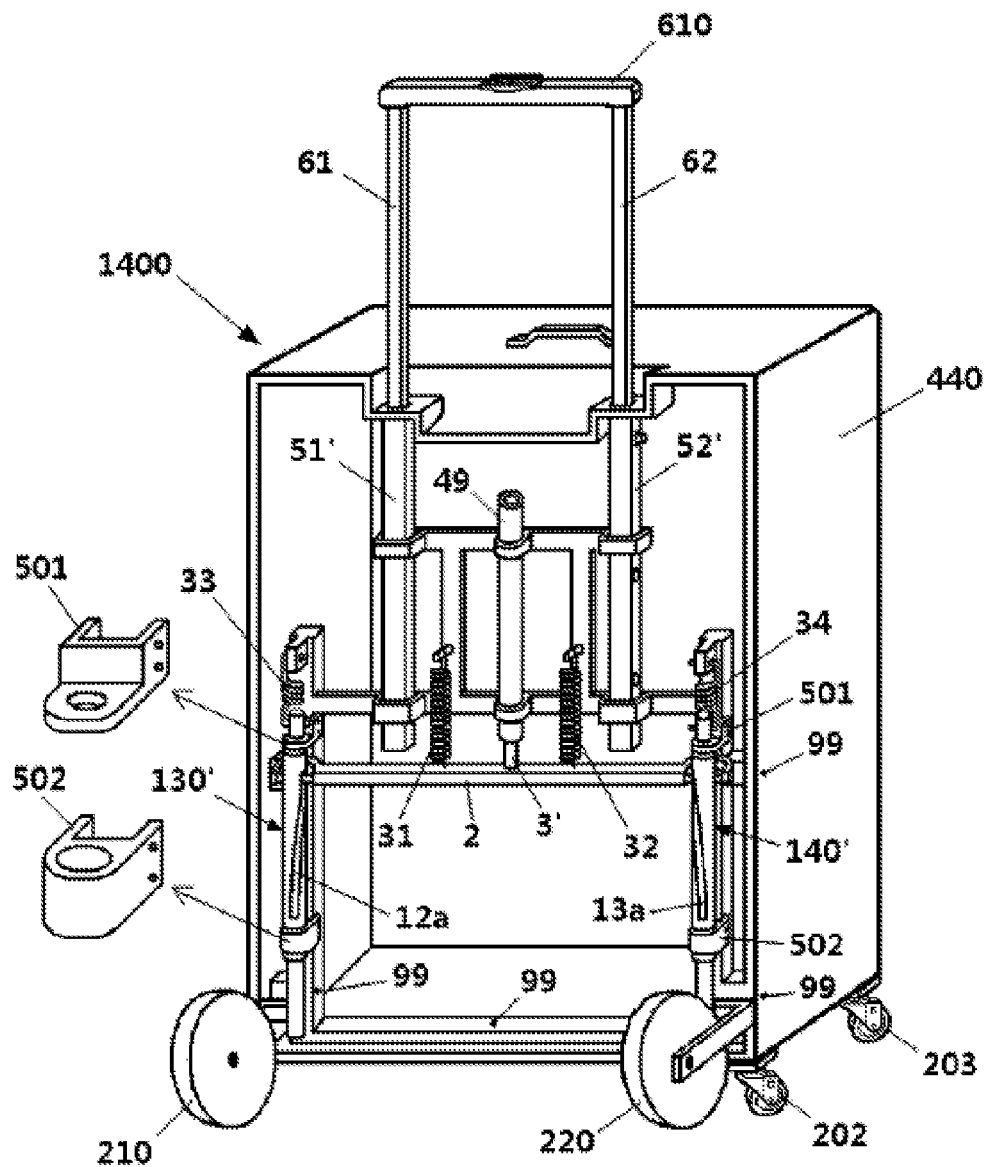
FIG. 18 is a schematic perspective view of a carrier implemented according to a fourth embodiment of the present invention.

FIG. 18 is a schematic perspective view of carrier 1400 implemented according to a fourth embodiment of the present invention. Since carrier 1400 of FIG. 18 is similar to carrier 1300 of FIG. 12, like reference numerals refer to like elements, and detailed description is omitted.

One or more elastic members 31 and 32 move cross bar 2 in one direction. In FIG. 18, one or more elastic members 31 and 32 move cross bar 2 upward, thereby allowing cross bar 2 to be on top.

Figure 19:
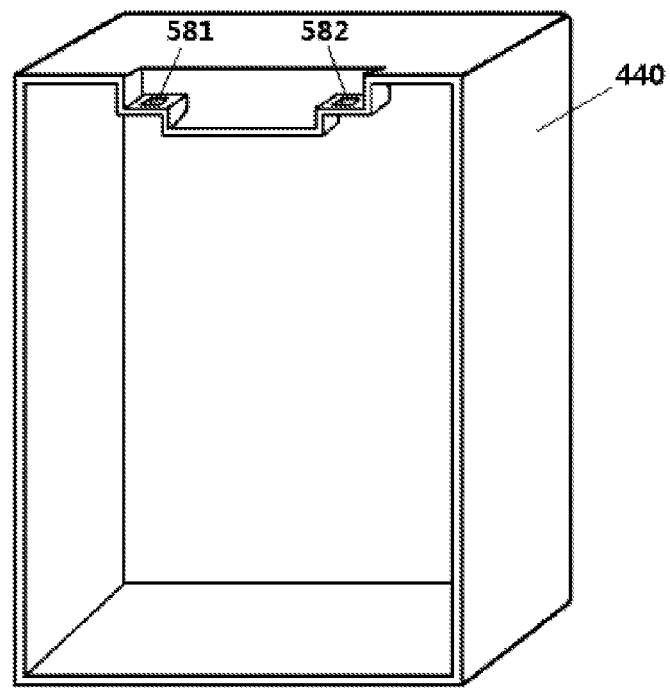
FIG. 19 is a schematic perspective view of the body of the carrier of FIG. 18.
Figure 20:
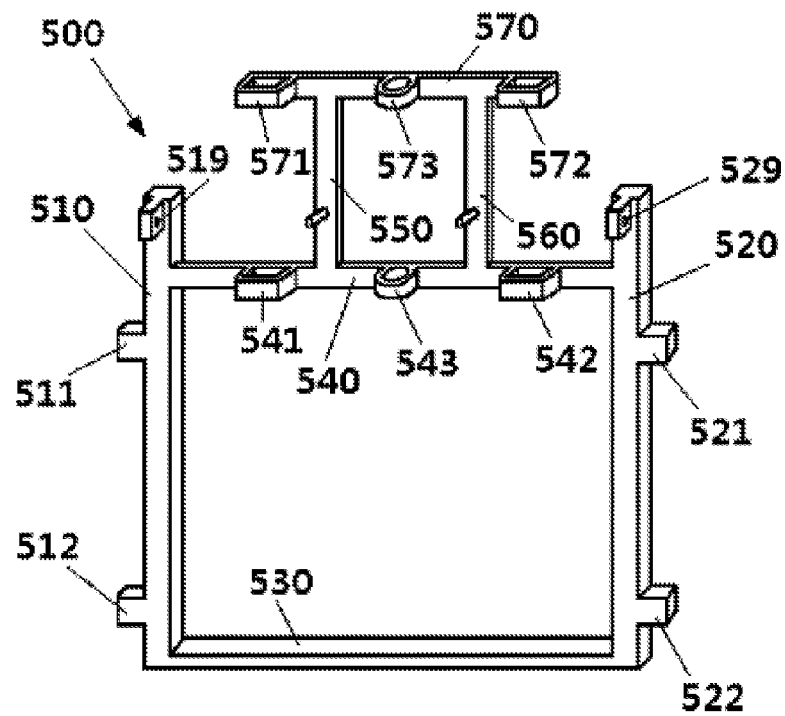
FIG. 20 is a schematic perspective view illustrating the frame installed in the body of FIG. 18.
Figure 21:
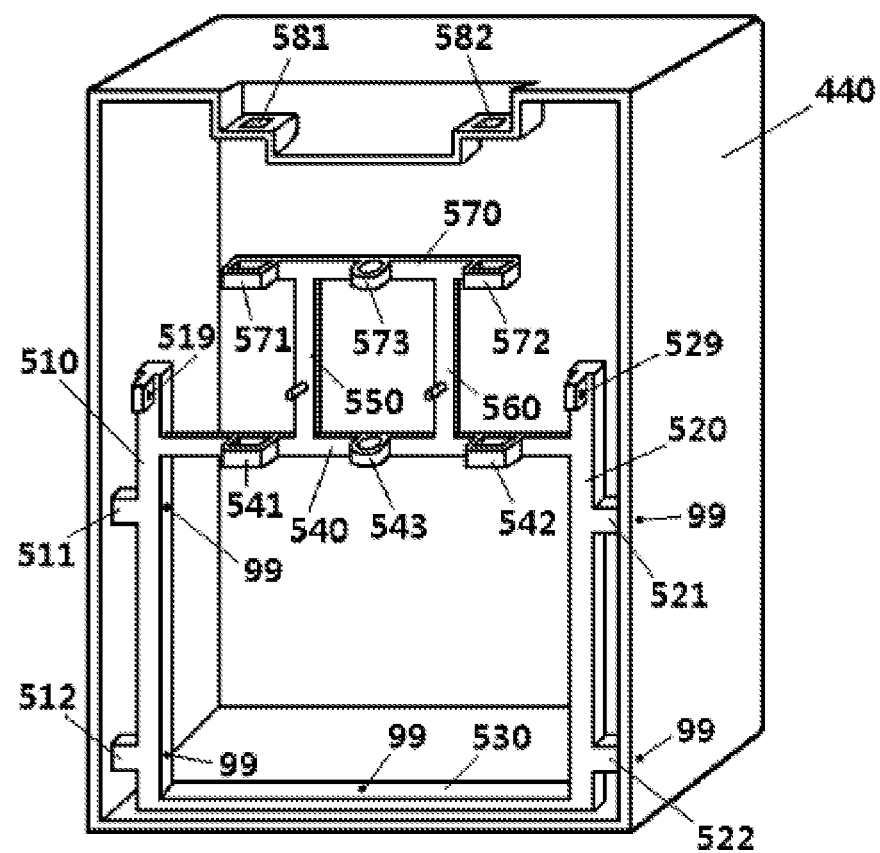
FIG. 21 is a schematic perspective view illustrating a state in which a frame like the one shown in FIG. 20 is installed on a body like the one shown in FIG. 19.

In carrier 1400 of FIG. 18, frame 500 as shown in FIG. 20 is installed on body 440 as shown in FIG. 19 in the same manner as in FIG. 21, and body 440 and frame 500 are fastened by one or more fastening means 99. Body 440 includes hole 581 and hole 582 for fixing sleeve 51' and sleeve 52'. Fastening means 99, which fasten body 440 and frame 500, may be diverse, such as rivets, screws, bolts, nuts, or adhesives but are not limited thereto. Otherwise, body 440 and frame 500 may be tied and fastened by a wire, a metal band, or a plastic band but are not limited thereto.

Otherwise, body 440 and frame 500 may be joined together by injection molding, etc. but are not limited thereto.

In frame 500, lower supporter 530, left supporter 510, right supporter 520, and central supporter 540 are mutually connected, and upper supporter 570 is connected above central supporter 540 by one or more connecting supporters 550 and 560. Central supporter 540 includes holder 541 and holder 542 for installing sleeves 51' and 52', and similarly, upper supporter 570 includes holder 571 and holder 572 for installing sleeves 51' and 52'. Handle bars 61 and 62 are positioned in sleeves 51' and 52' so they can slide vertically.

Central supporter 540 and upper supporter 570 include holders 543 and 573 for installing sleeve 49. Guide bar 3' is positioned in sleeve 49 so that it can slide vertically.

Left supporter 510 includes one or more spacers 511 and 512, and similarly, right supporter 520 includes one or more spacers 521 and 522. Left supporter 510 may be maintained at a certain distance from body 440 because of spacers 511 and 512, and similarly, right supporter 520 may be maintained at a certain distance from body 440 because of spacers 521 and 522.

Left supporter 510 includes hole 519 for connecting elastic member 33 by inserting one side of elastic member 33 thereinto. Similarly, right supporter 520 includes hole 529 for connecting elastic member 34 by inserting one side of elastic member 34 thereinto. The structure and shape of frame 500 are merely an example, and the present invention is not limited thereto.

Figure 22:
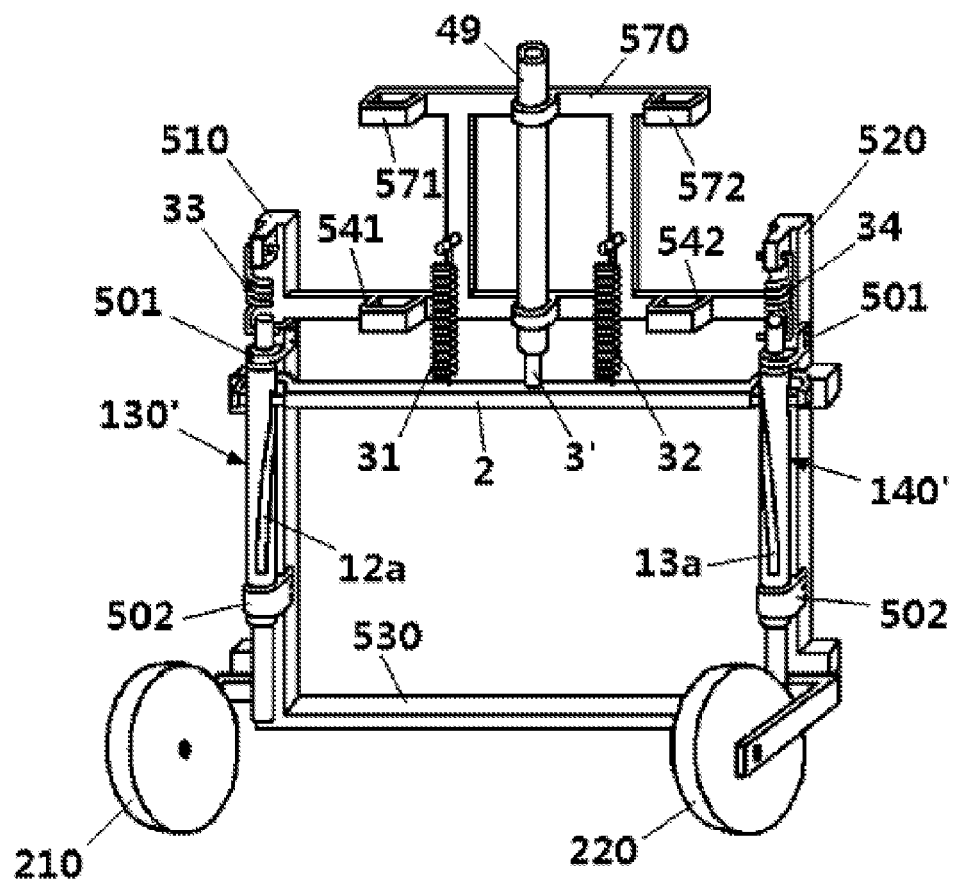
FIG. 22 is a schematic perspective view illustrating a state in which rotatable rods, wheels, a cross bar, and one or more elastic members are installed on the frame of FIG. 20.

FIG. 22 is a perspective view schematically illustrating that rotatable rod 130' is installed on left supporter 510 of frame 500 by sleeve 502 and bracket 501. Similarly, rotatable rod 140' is installed on right supporter 520 by sleeve 502 and bracket 501. Cross bar 2 is installed to connect rotatable rod 130' and rotatable rod 140' as shown in FIG. 12.

As shown in FIG. 22, as elastic members 31 and 32 contract, cross bar 2 is pulled upward in such a way that cross bar 2 moves upward and wheel 210 and wheel 220 are unfolded toward the front.

Figure 23:
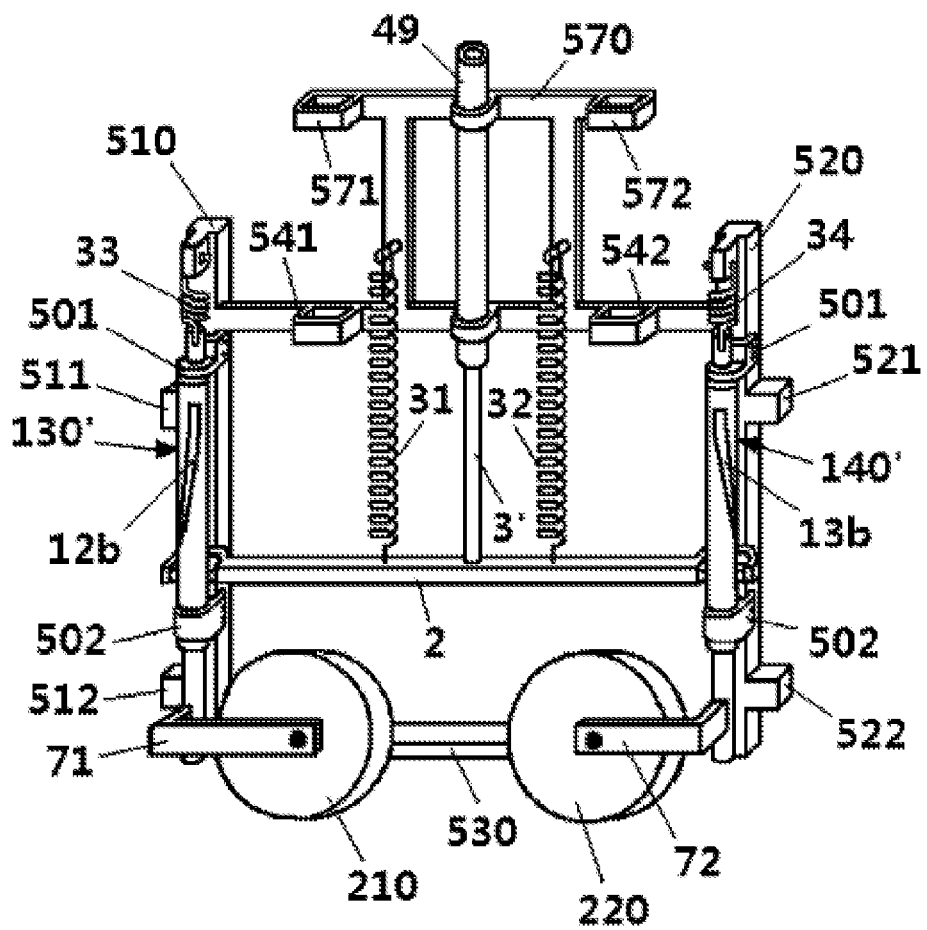
FIG. 23 is a schematic diagram illustrating an operational state of the members installed on the frame of FIG. 20.

FIG. 23 is a perspective view schematically illustrating a state in which cross bar 2 is moved downward in the state shown in FIG. 22 in such a way that elastic members 31 and 32 stretch by certain lengths, rotatable rod 130' turns counterclockwise by a certain angle, rotatable rod 140' turns clockwise by a certain angle, wheels 210 and 220 are folded toward the middle, and elastic members 33 and 34 are twisted by certain angles.

Figure 24:
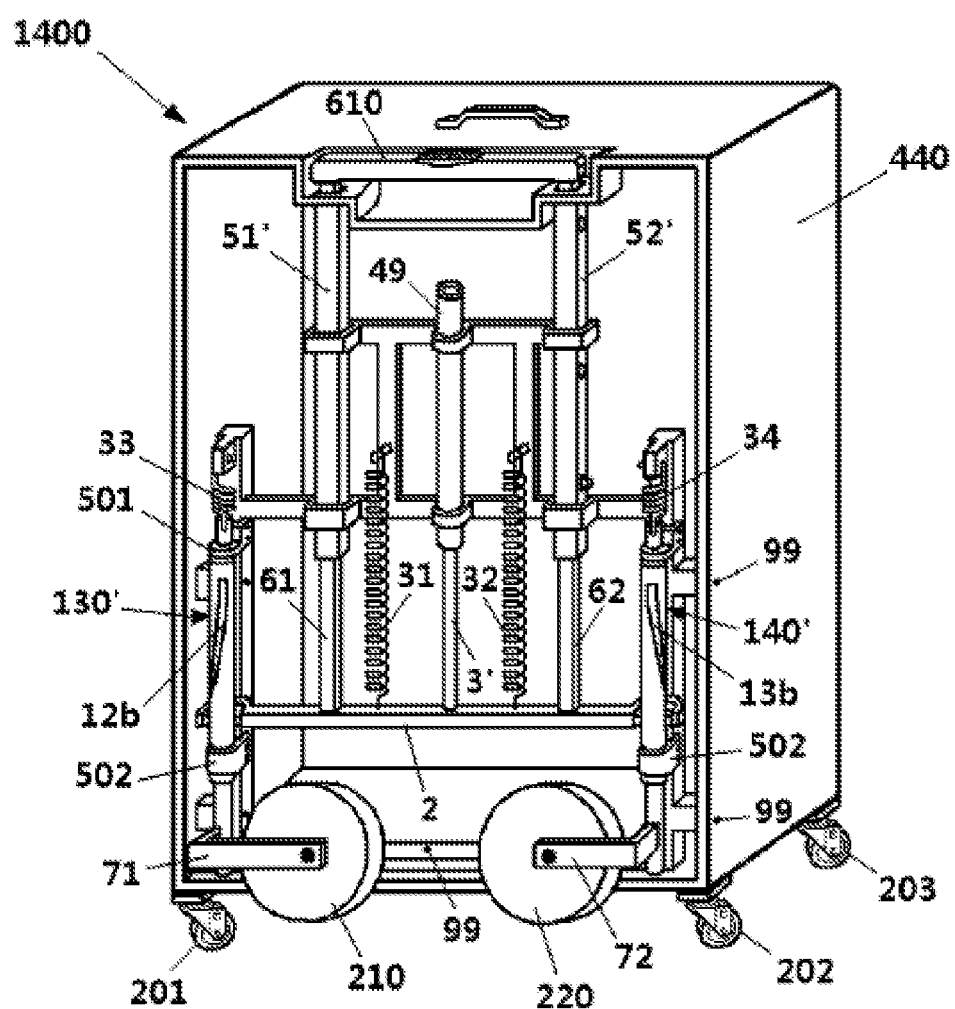
FIG. 24 is a schematic diagram illustrating an operational state of the carrier of FIG. 18.

In FIG. 24, as one or more handle bars 61 and 62 are moved downward by pushing handle 610 in the carrier of FIG. 18, wheels 210 and 220 are folded toward the middle as shown in FIG. 24.

When handle 610 is raised in the state shown in FIG. 24, due to the contractile force of one or more elastic members 31 and 32 and the torsion force of one or more elastic members 33 and 34, cross bar 2 moves upward, rotatable rod 130' turns clockwise by a certain angle, and rotatable rod 140' turns counterclockwise by a certain angle, thereby unfolding wheels 210 and 220 connected to and installed on rotatable rods 130' and 140', respectively, to the front, as shown in FIG. 18.

Figure 25:
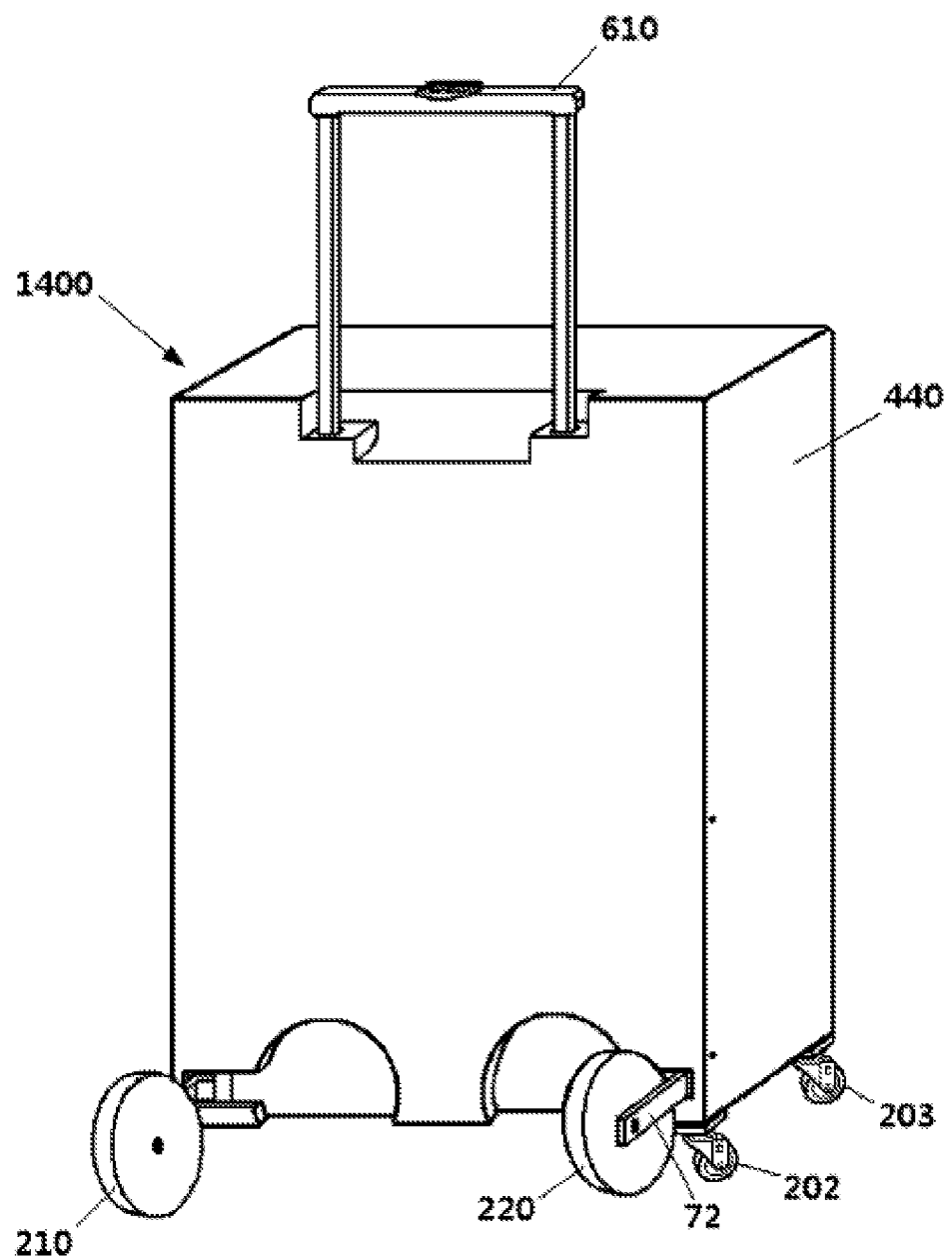
FIG. 25 is a schematic perspective view illustrating improved exterior of the carrier of FIG. 18.

FIG. 25 is a schematic perspective view illustrating a state in which elastic members 31 and 32, cross bar 2, guide bar 3', etc. are hidden to improve the external appearance of carrier 1400 of FIG. 18.

Figure 26:
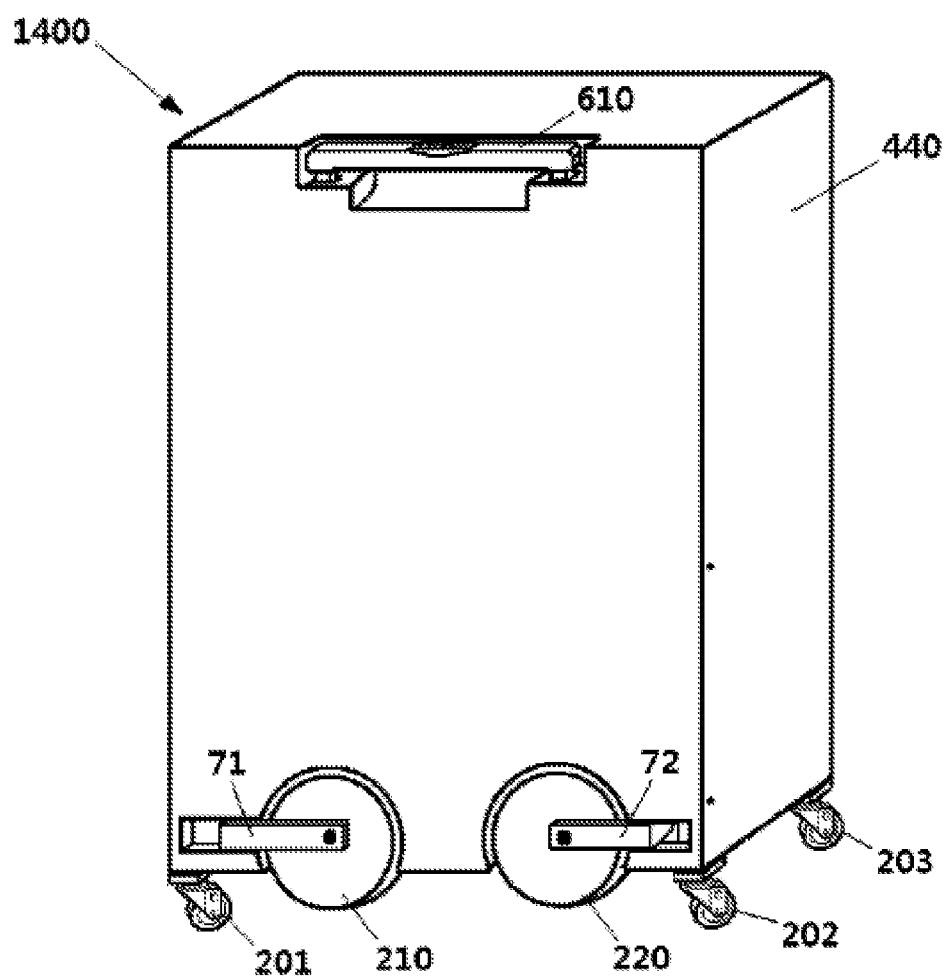
FIG. 26 is a schematic diagram illustrating an operational state of the carrier of FIG. 25.

FIG. 26 illustrates a state in which handle 610 is pushed down and wheels 210 and 220 are folded toward the middle in carrier 1400 of FIG. 25.

Figure 27:
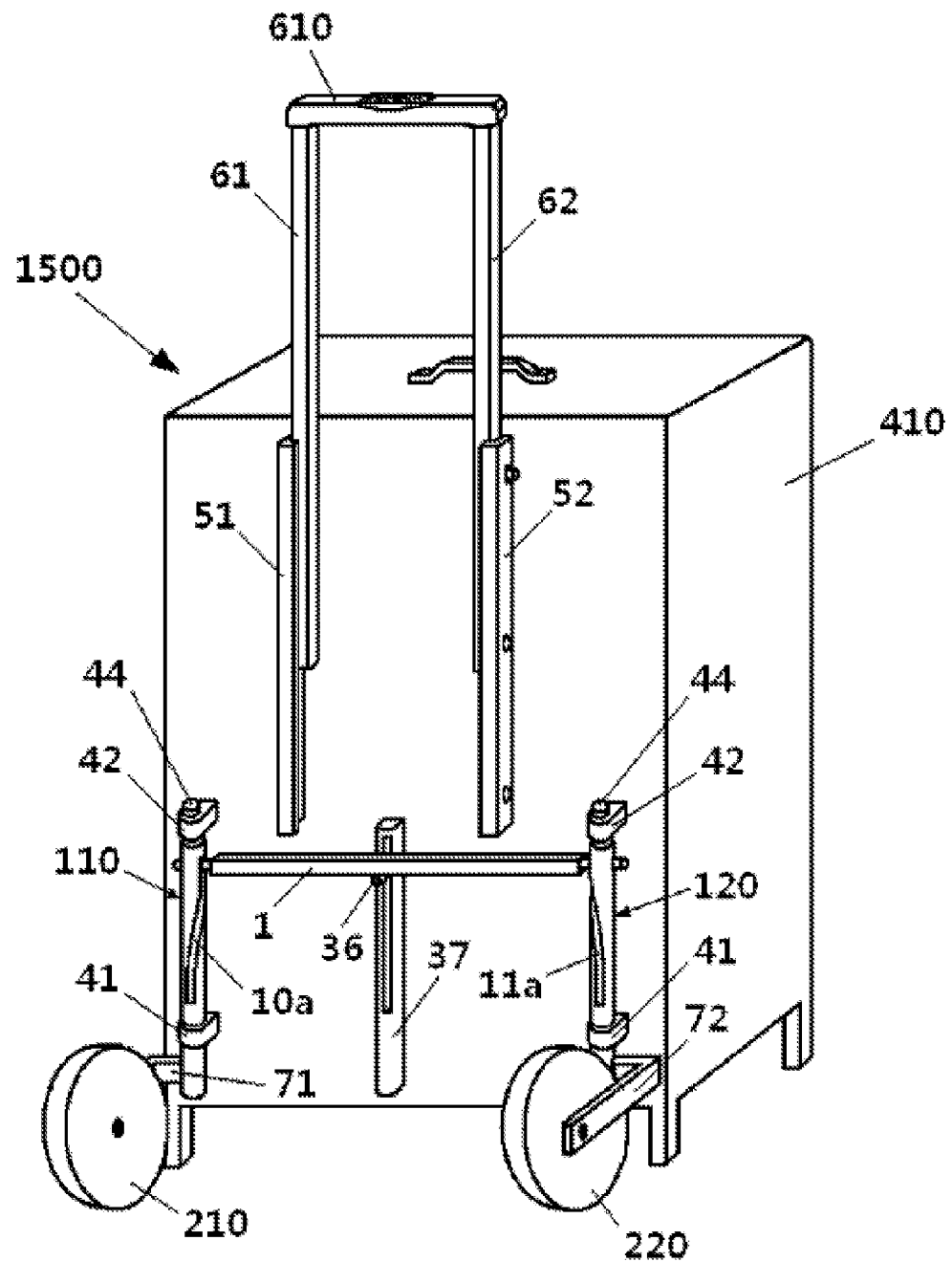
FIG. 27 is a schematic perspective view of a carrier implemented according to a fifth embodiment of the present invention.

FIG. 27 is a schematic perspective view of a carrier 1500 implemented according to a fifth embodiment of the present invention.

Figure 28:
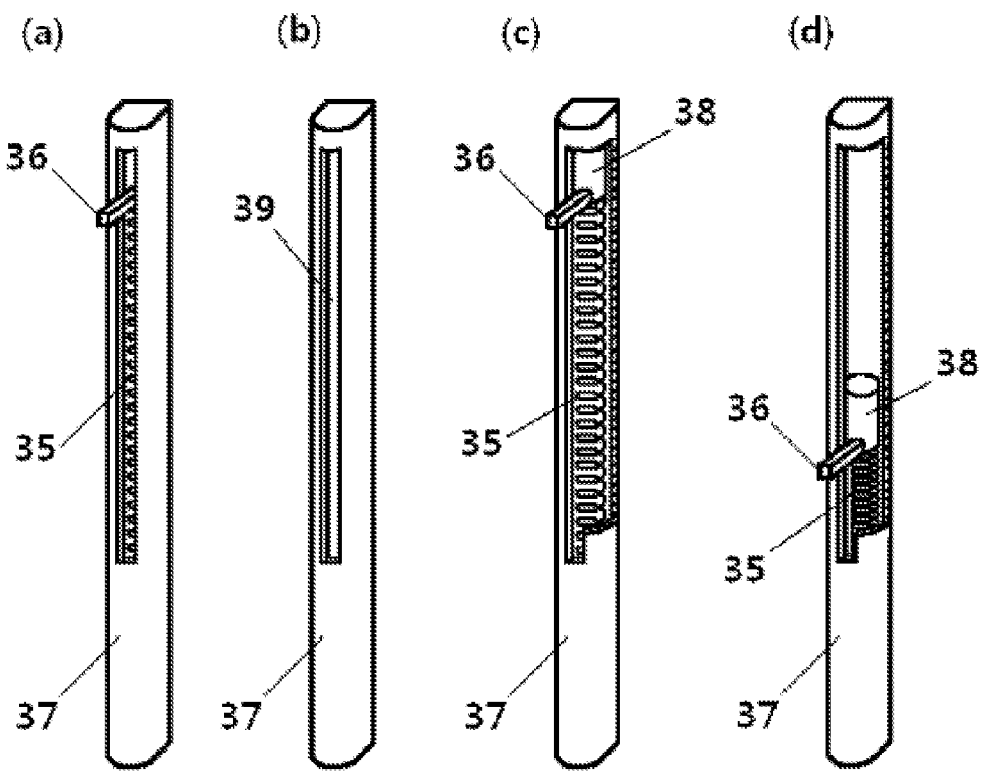
FIG. 28 is schematic perspective view illustrating the housing included in the carrier of FIG. 27 and the internal configuration thereof.

Since carrier 1500 of FIG. 27 is identical to carrier 1100 of FIG. 3 except that one or more housings 37, including elastic member 35 as shown in FIG. 28(*a*), are installed on body 410 instead of elastic members 31 and 32, like reference numerals refer to like elements, and detailed description is omitted.

FIG. 28(*b*) is a schematic perspective view of housing 37 of FIG. 28(*a*). Housing 37 includes slot 39.

FIG. 28(*c*) is a partial cross-sectional view illustrating elastic member 35 and guide rod 38 integrated with pusher 36 formed thereabove installed on housing 37 of FIG. 28(*b*). Elastic member 35 may be a compression spring as shown in the drawing.

Compared with FIG. 28(*c*), FIG. 28(*d*) illustrates a state in which guide rod 38 and pusher 36 are moved downward and elastic member 35 is compressed.

As shown in FIG. 28(*a*), pusher 36 partially protrudes outward from slot 39 and can slide vertically.

Elastic member 35 moves cross bar 1 in one direction. In FIG. 27, since elastic member 35 formed by the compression spring moves cross bar 1 upward in such a way that cross bar 1 moves upward and wheels 210 and 220 are folded to the front of body 410.

In FIG. 27, due to the restoring force of elastic member 35 in housing 37 installed on body 410 of carrier 1500, pusher 36 is pushing cross bar 1 upward.

Figure 29:
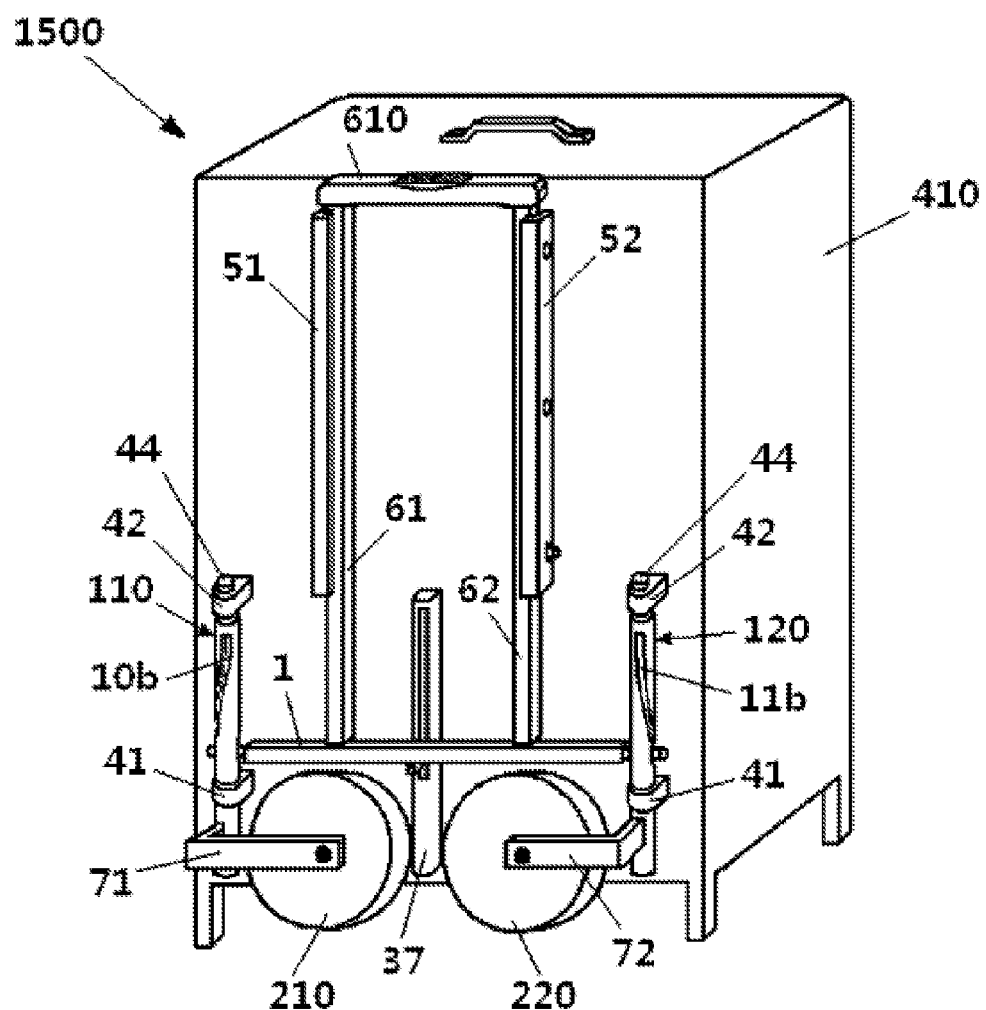
FIG. 29 is a schematic diagram illustrating an operational state of the carrier of FIG. 27.

FIG. 29 illustrates a state in which as the pair of handle bars 61 and 62 are moved downward by pushing handle 610 on carrier 1500 of FIG. 27, one or more handle bars 61 and 62 come into contact with cross bar 1 and push cross bar 1 downward in such a way that rotatable rods 110 and 120 turn in longitudinal directions thereof by certain angles, thereby folding wheels 210 and 220 toward the middle. The cross bar 1 moves downward and pushes pusher 36 in such a way that elastic member 35 becomes compressed, as shown in FIG. 28(*d*).

As guide bar 3 is installed on cross bar 2 of FIG. 12 and guide bars 5 on cross bar 4 of FIG. 30, one or more guide bars may be installed on the cross bar 1 of FIG. 27.

As one or more elastic members 33 and 34 are connected to and installed on the pair of rotatable rods 130 and 140 of FIG. 12, one or more elastic members 33 and 34 may be connected to and installed on the pair of rotatable rods 110 and 120 of FIG. 27.

FIG. 30 is a schematic perspective view of a carrier 1600 implemented according to a sixth embodiment of the present invention.

Since carrier 1600 of FIG. 30 is similar to carrier 1100 of FIG. 3 and carrier 1300 of FIG. 12, like reference numerals refer to like elements, and detailed description is omitted.

As shown in FIG. 30, one or more handle bars 67 are installed on one or more sleeves 55 of body 450, and handle bar 67 can slide vertically through sleeve 55. (In FIG. 30, one handle bar 67 is installed on sleeve 55 of body 450.)

In carrier 1600 of FIG. 30, rotatable rod 150 (which includes one or more helical lines 14*a* and 14*b*) and rotatable rod 160 (which includes one or more helical lines 15*a* and 15*b*) are connected by cross bar 4. Cross bar 4 is shaped like cross bar 2 of FIG. 5(*b*) or cross bar 2' of FIG. 5(*c*).

Since one or more guide bars 5 are formed on cross bar 4 of FIG. 30 as guide bar 3 is formed on cross bar 2 of carrier 1300 of FIG. 12, guide bars 5 can slide vertically through one or more sleeves 47. (In FIG. 30, two guide bars 5 are installed on cross bar 4.)

Since protrusion 9 is formed on cross bar 4, protrusion 9 is positioned on sleeve groove 56.

Since protrusion 9 provides an enlarged contact portion area when handle bar 67 is in contact with cross bar 4, handle bar 67 may push cross bar 4 more reliably and stably while handle bar 67 slides downward.

One or more elastic members 31 and 32 move cross bar 4 in one direction. In FIG. 30, one or more elastic members 31 and 32 move cross bar 4 upward due to the restoring force thereof, allowing cross bar 4 to be on top.

When handle 630 in FIG. 30 is pushed, handle bar 67 moves downward and comes in contact with cross bar 4, and pushes cross bar 4 downward. Then wheels 210 and 220 installed on wheel supporters 73 and 74, respectively, turned backward in longitudinal directions of rotatable rods 150 and 160, positioning closer to portions 90 depressed inwards formed on both sides of body 450, as shown in FIG. 31.

Figure 31:
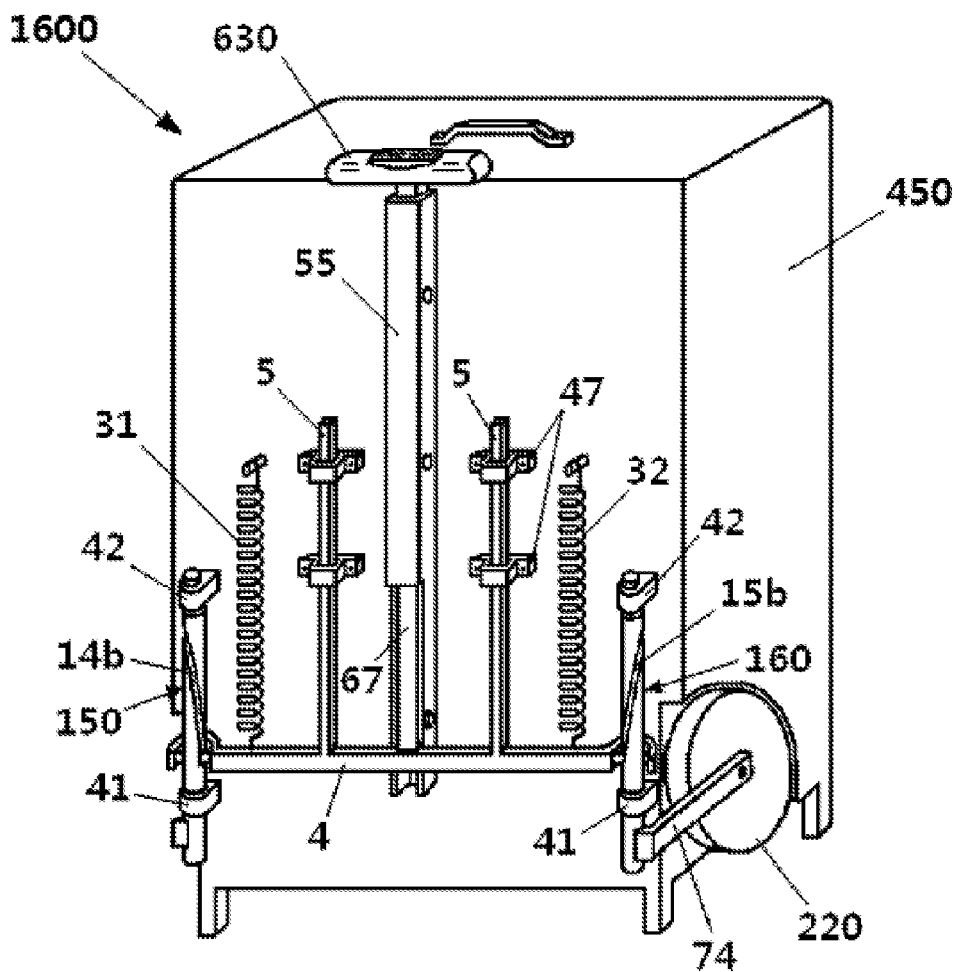
FIG. 31 is a schematic diagram illustrating an operational state of the carrier of FIG. 30.

When handle bar 67 is allowed to slide upward by raising handle 630 in the state of FIG. 31, since one or more elastic members 31 and 32 contract due to restoring force thereof and pull cross bar 4 upward, cross bar 4 is raised upward, rotatable rod 150 turns counterclockwise by a certain angle, and rotatable rod 160 turns clockwise by a certain angle, thereby unfolding wheels 210 and 220 toward both sides of body 450, as shown in FIG. 30.

When wheels 210 and 220 are turned backward as shown in FIG. 31 after being unfolded toward both sides of body 450 as shown in FIG. 30, angles at which rotatable rods 150 and 160 turn in longitudinal directions clockwise and counterclockwise, respectively, may be 180° but are not limited thereto.

Figure 32:
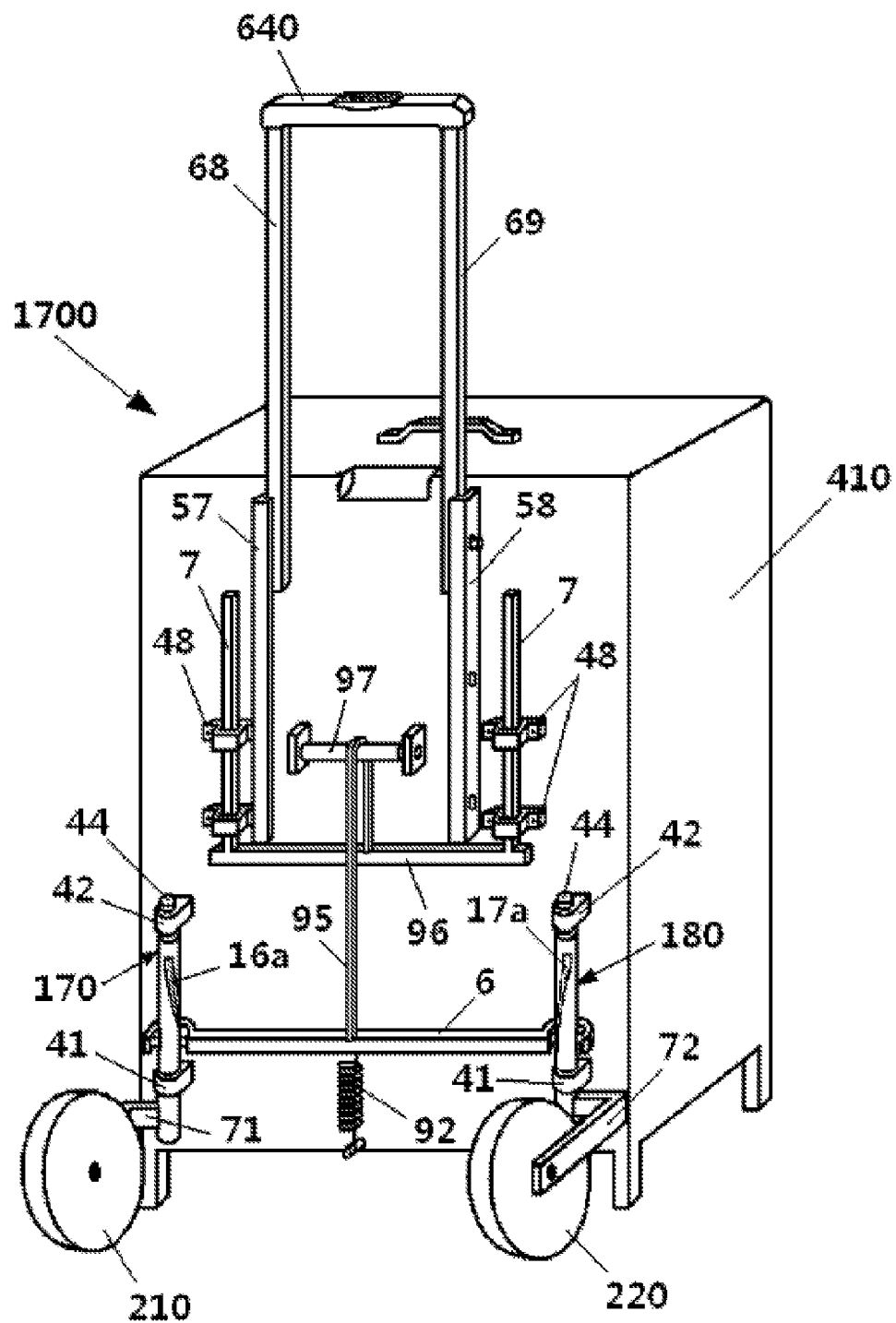
FIG. 32 is a schematic perspective view of a carrier implemented according to a seventh embodiment of the present invention.

FIG. 32 is a schematic perspective view of a carrier 1700 implemented according to a seventh embodiment of the present invention.

Since carrier 1700 of FIG. 32 is similar to carrier 1100 of FIG. 3 and carrier 1600 of FIG. 30, like reference numerals refer to like elements and detailed description is omitted.

As shown in FIG. 32, rotatable rod 170 (which includes one or more helical lines 16a and 16b) and rotatable rod 180 (which includes one or more helical lines 17a and 17b) are connected by cross bar 6. Helical lines 16a, 16b, 17a, and 17b are formed as grooves with certain depths.

Cross bar 6 has a shape like that of cross bar 2 of FIG. 5(b) or cross bar 2' of FIG. 5(c).

As shown in FIG. 32, traction bar 96 and one or more guide bars 7 joined thereto are installed on body 410. Since guide bars 7 can slide vertically through sleeves 48, guide bars 7 help traction bar 96 in maintaining horizontal balance when traction bar 96 moves vertically.

Switching shaft 97 is installed on body 410, and rope 95 passes across switching shaft 97 and is connected between cross bar 6 and traction bar 96. Switching shaft 97 may have a roller structure for smooth movement of rope 95 and may pivot in longitudinal direction forward and backward.

One side of one or more elastic members 92 is connected to cross bar 6 and the other side is connected to and installed on body 410. Elastic members 92 may be tension springs but are not limited thereto. In FIG. 32, one elastic member 92 formed with a tension spring is installed while one side is connected to cross bar 6 and the other side is connected to body 410.

Elastic member 92 moves cross bar 6 in one direction. In FIG. 32, Elastic member 92 moves cross bar 6 downward, thereby allowing cross bar 6 to be at the bottom.

Since elastic member 92 contracts due to its restoring force and pulls cross bar 6 downward as shown in FIG. 32, cross bar 6 moves downward, and wheels 210 and 220 are unfolded toward the front of body 410. In addition, rope 95 passes across switching shaft 97 and pulls traction bar 96 to allow traction bar 96 to be on top.

Figure 33:
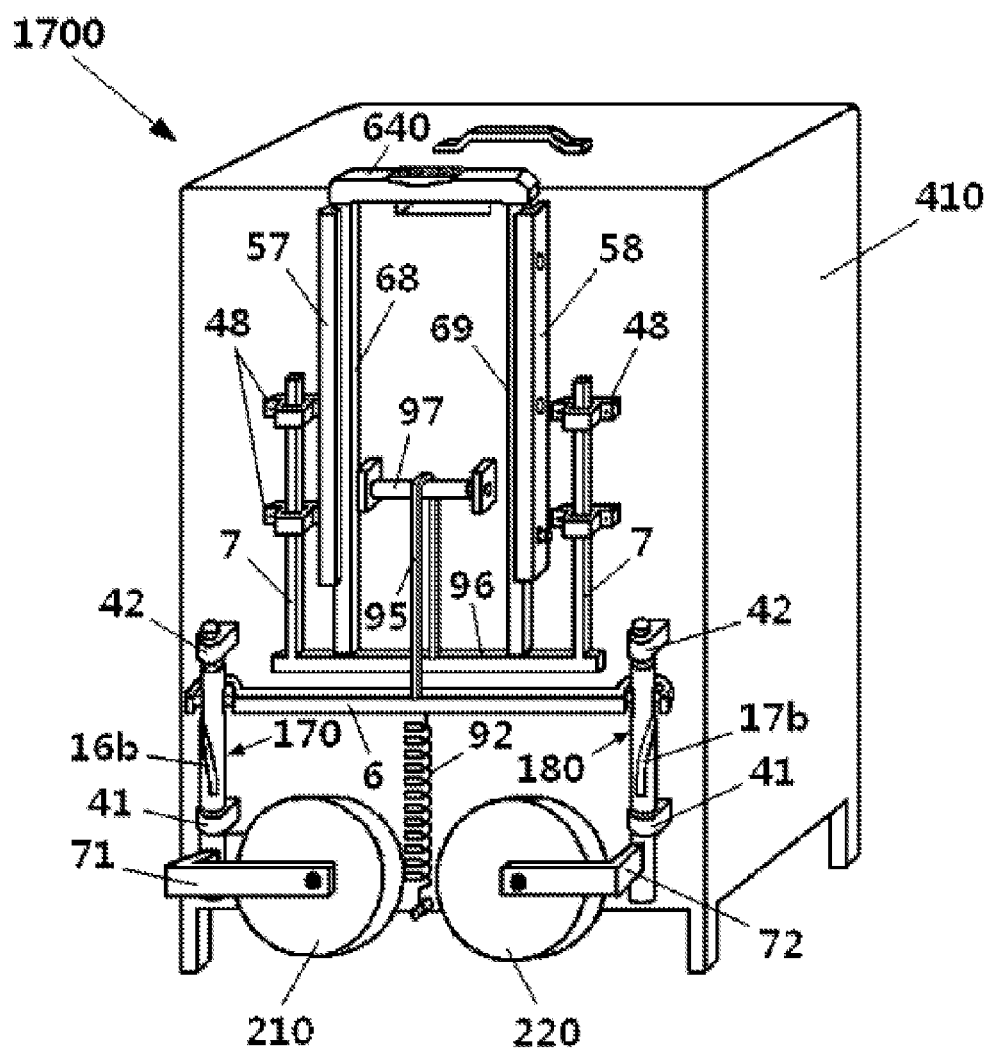
FIG. 33 is a schematic diagram illustrating an operational state of the carrier of FIG. 32.

When one or more handle bars 68 and 69 are allowed to slide downward along guide rails 57 and 58 by pushing handle 640 in FIG. 32, as one or more handle bars 68 and 69 push traction bar 96, rope 95 pulls cross bar 6 upward to move cross bar 6 upward. Accordingly, rotatable rod 170 turns in longitudinal direction counterclockwise by a certain angle and rotatable rod 180 turns in longitudinal direction clockwise by a certain angle, thereby folding wheels 210 and 220 toward the middle, as shown in FIG. 33.

When a pair of handle bars 68 and 69 are allowed to slide upward by pushing handle 640, cross bar 6 moves downward due to elastic member 92, traction bar 96 moves upward by a certain distance, rotatable rods 170 turn in longitudinal direction clockwise by a certain angle, and rotatable rod 180 turns in longitudinal direction counterclockwise by a certain angle, creating a space between wheels 210 and 220 and unfolding them toward the front of body 410, as shown in FIG. 32.

Guide bar 3 is installed on cross bar 2 of FIG. 12 and guide bars 5 are installed on cross bar 4 of FIG. 30. Although not shown in the drawing, similarly, one or more guide bars may be installed on cross bar 6 of FIG. 32, thereby allowing cross bar 6 to maintain horizontal balance while cross bar 6 is moving vertically.

In addition, although not shown in the drawing, cross bar 6 can be pushed from top to bottom by the restoring force of one or more elastic members formed with compression springs in carrier 1700, as shown in FIG. 27, instead of one or more elastic members 92 formed with tension springs.

One or more elastic members 33 and 34 are connected to and installed on the pair of rotatable rods 130 and 140 of FIG. 12. Similarly, one or more elastic members 33 and 34 may be connected to and installed on the pair of rotatable rods 170 and 180 of FIG. 32.

Figure 34:
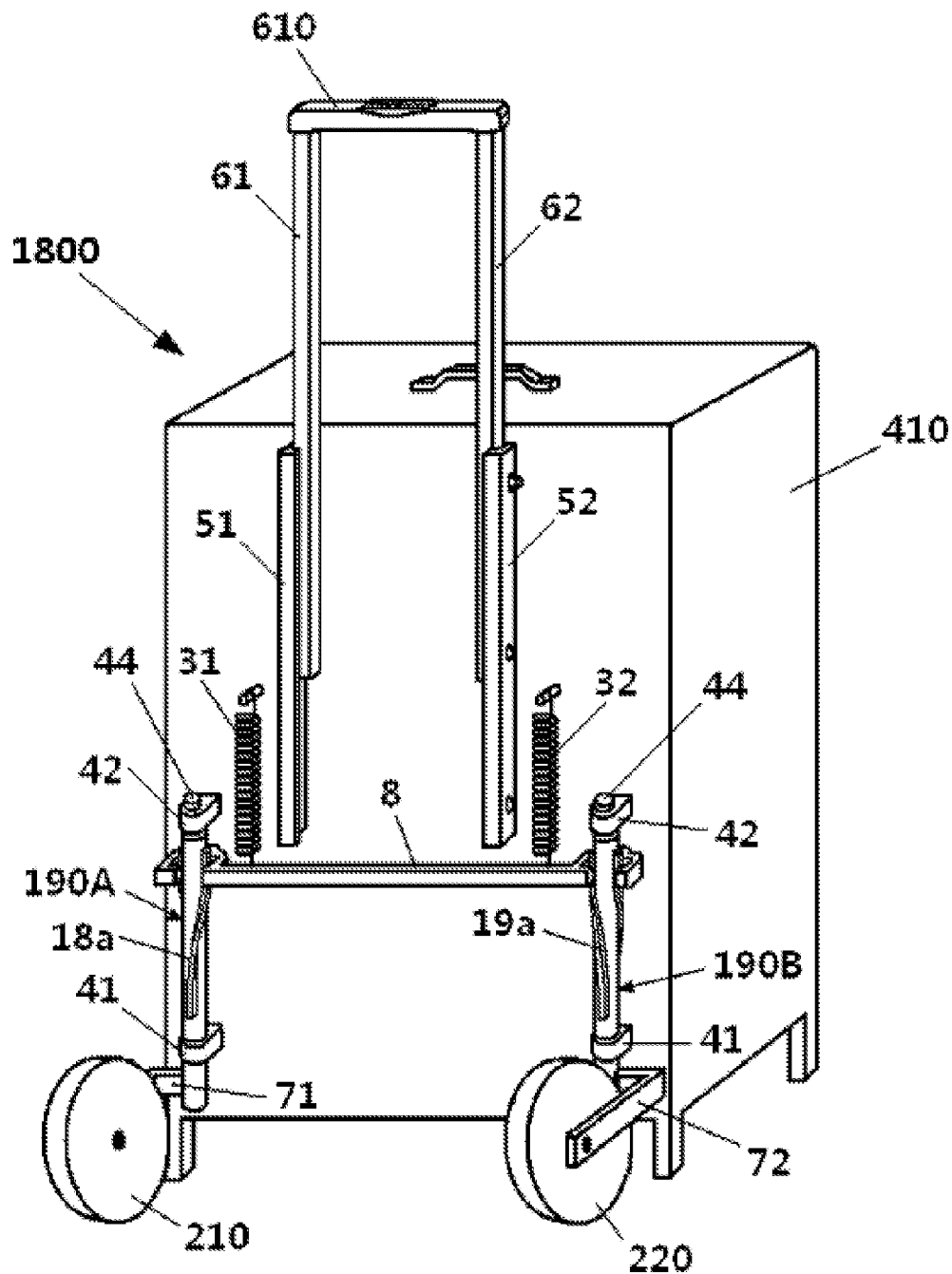
FIG. 34 is a schematic perspective view of a carrier implemented according to an eighth embodiment of the present invention.

FIG. 34 is a schematic perspective view of a carrier 1800 implemented according to an eighth embodiment of the present invention.

Since carrier 1800 of FIG. 34 is similar to carrier 1100 of FIG. 3, like reference numerals refer to like elements, and detailed description is omitted.

Figure 36:
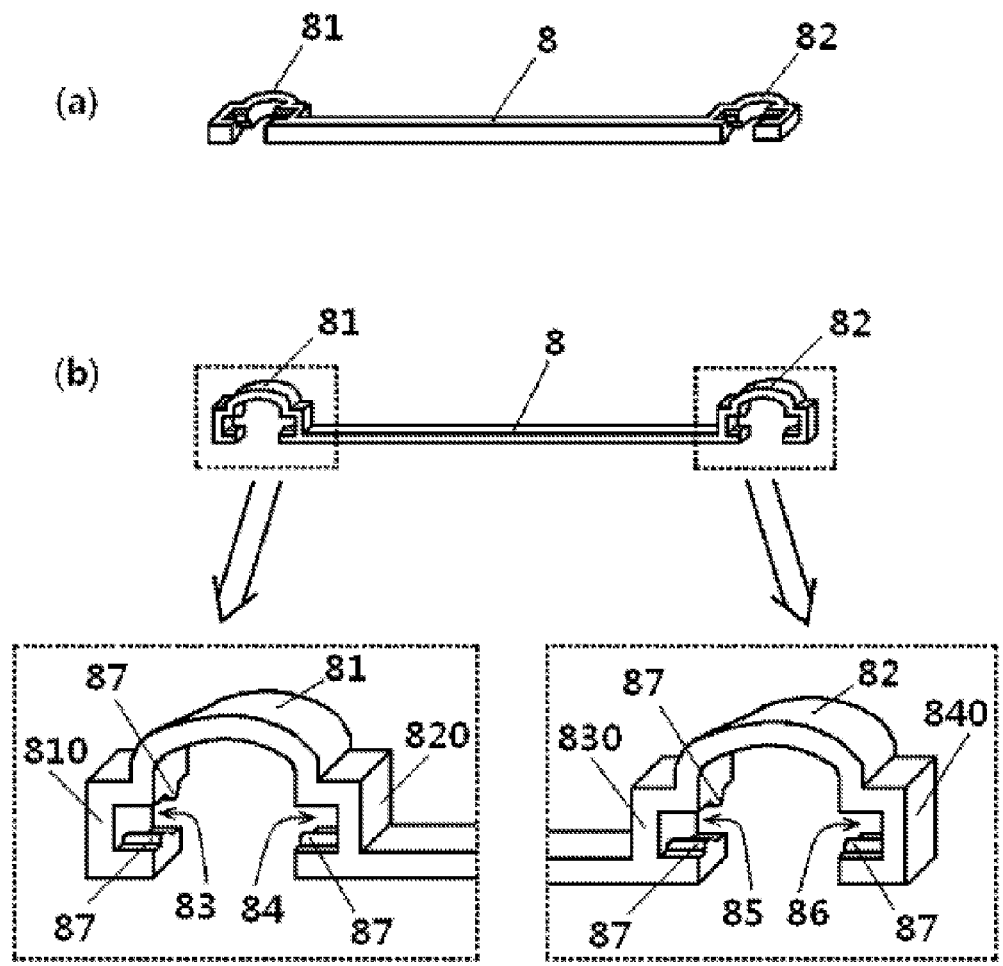
FIG. 36 is a view illustrating a shape of the cross bar included in the carrier of FIG. 34.

As shown in FIG. 34, cross bar 8 as shown in FIG. 36(a) is connected and installed between rotatable rods 190A and 190B.

FIG. 36(a) illustrates cross bar 8 included in carrier 1800 of FIG. 34. FIG. 36(b) is a partial enlarged view illustrating a state in which connecting portions 81 and 82 of cross bar 8 of FIG. 36(a) face upward. As shown in FIG. 36(b), one or more helical line coupling portions 810 and 820 are installed on one side of cross bar 8, and one or more helical line coupling portions 830 and 840 are installed on the other side.

Concave portion 83, which is concave leftwards, is formed on helical line coupling portion 810, and concave portion 84, which is concave rightwards, is formed on helical line coupling portion 820.

Concave portion 85, which is concave leftwards, is formed on helical line coupling portion 830, and concave portion 86, which is concave rightwards, is formed on helical line coupling portion 840.

Both side portions 87 of concave portions 83, 84, 85, and 86 of helical line coupling portions 810, 820, 830, and 840 may be convexly formed curved surfaces, as shown in FIG. 36(b). This is because concave portions 83 and 84 and concave portions 85 and 86 may slide more smoothly in the vertical direction along helical lines 18b and 18a and helical lines 19a and 19b.

Helical line coupling portions 810 and 820 are connected by connecting portion 81, and similarly, helical line coupling portions 830 and 840 are connected by connecting portion 82.

The shapes of helical line coupling portions 810, 820, 830, and 840 and the shapes of connecting portions 81 and 82 are merely examples, and the present invention is not limited thereto.

The shape of cross bar 8 is merely an example, and the present invention is not limited thereto.

Figure 37:
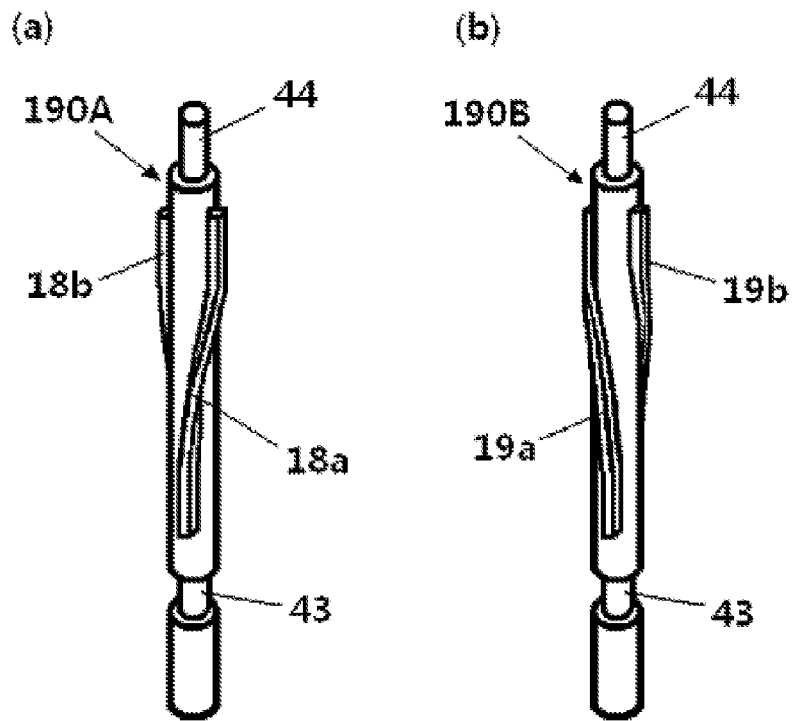
FIG. 37 is a schematic perspective view illustrating the rotatable rods included in the carrier of FIG. 34.

Rotatable rods 190A and 190B having shapes shown in FIG. 37 are installed on body 410 of FIG. 34. Rotatable rod 190A includes one or more helical lines 18a and 18b, and similarly, rotatable rod 190B includes one or more helical lines 19a and 19b. In the drawing, rotatable rods 190A 190B include two helical lines each.

Helical lines 18a and 18b formed on rotatable rod 190A of FIG. 37(a) and helical lines 19a and 19b formed on rotatable rod 190B of FIG. 37(b) protrude at certain heights and have convex portions.

Since helical line 18b of rotatable rod 190A is inserted into concave portion 83, helical line coupling portion 810 is coupled with helical line 18b. Since helical line 18a of rotatable rod 190A is inserted into concave portion 84, helical line coupling portion 820 is coupled with helical line 18a.

Similarly, since helical line 19a of rotatable rod 190B is inserted into concave portion 85, helical line coupling portion 830 is coupled with helical line 19a. Since helical line 19b of rotatable rod 190B is inserted into concave portion 86, helical line coupling portion 840 is coupled with helical line 19b.

As cross bar 8 moves vertically, helical line coupling portions 810 and 820 and helical line coupling portions 830 and 840 slide along helical lines 18b and 18a, and rotatable rod 190A and rotatable rod 190B turn in longitudinal directions clockwise or counterclockwise by certain angles.

One or more elastic members 31 and 32 move cross bar 8 in one direction. In FIG. 34, one or more elastic members 31 and 32 move cross bar 8 upward, thereby allowing cross bar 8 to be on top.

Figure 35:
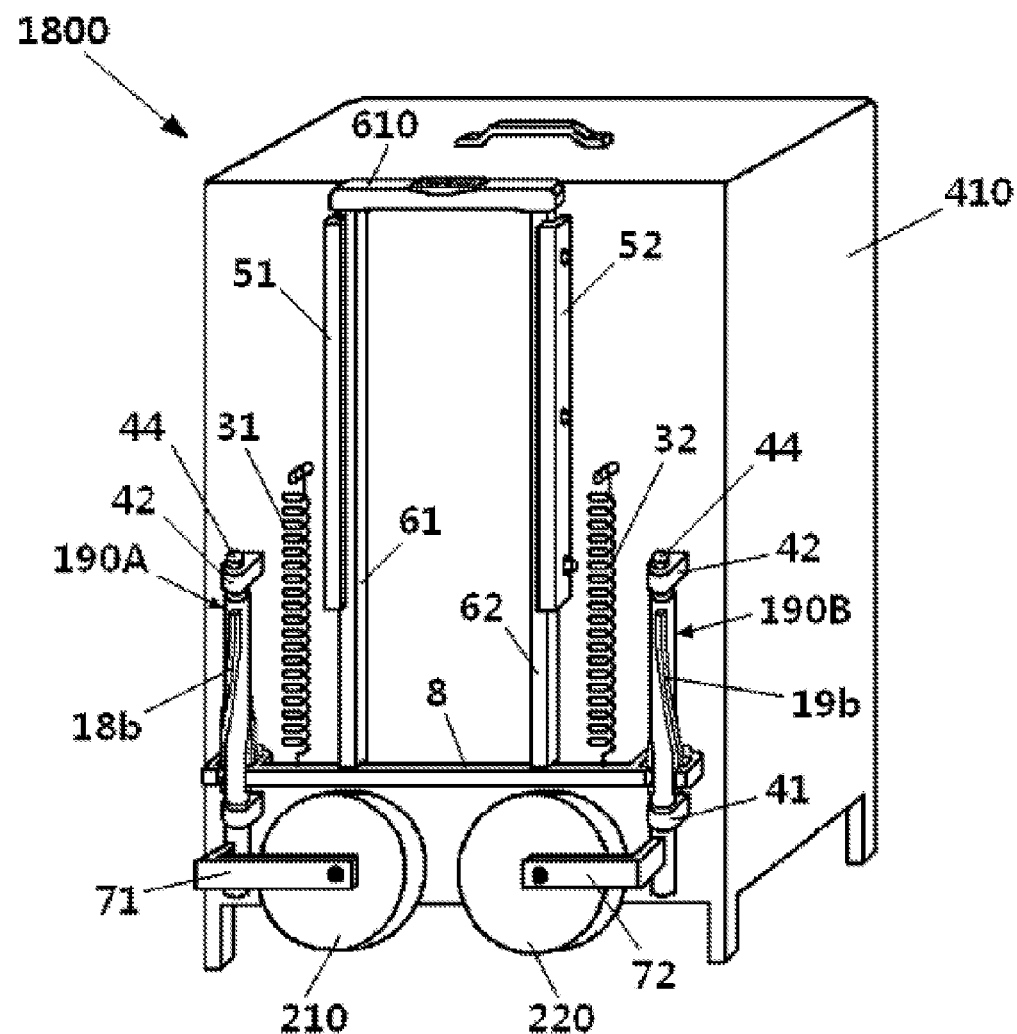
FIG. 35 is a schematic diagram illustrating an operational state of the carrier of FIG. 34.

In FIG. 35, as handle bars 61 and 62 are moved downward by pushing handle 610 in carrier 1800 of FIG. 34, since one or more handle bars 61 and 62 come into contact with cross bar 8 and push cross bar 8 downward, rotatable rod 190A turns in longitudinal direction counterclockwise by a certain angle, and rotatable rod 190B turns in longitudinal direction clockwise by a certain angle, thereby folding wheels 210 and 220 toward the middle.

When handle 610 is raised in the state shown in FIG. 35, as cross bar 8 moves upward due to the restoring forces of elastic members 31 and 32, rotatable rod 190A turns in longitudinal direction clockwise by a certain angle, and rotatable rod 190B turns in longitudinal direction counterclockwise by a certain angle, thereby unfolding wheels 210 and 220 toward the front of body 410.

As guide bar 3 is installed on cross bar 2 of FIG. 12 and guide bars 5 are installed on cross bar 4 of FIG. 30, one or more guide bars may be installed on cross bar 8 of carrier 1800 of FIG. 35.

Also, one or more elastic members 33 and 34 are installed on the pair of rotatable rods 130 and 140 of FIG. 12. Similarly, one or more elastic members 33 and 34 may be connected to and installed on the pair of rotatable rods 190A and 190B included in carrier 1800 of FIG. 34.

Rotatable rods 190A and 190B of FIGS. 37(a) and 37(b) may be shaped like rotatable rods 190A and 190B of FIGS. 38(a) and 38(b). In helical lines 18a, 18b, 19a, and 19b of rotatable rods 190A and 190B of FIGS. 38(a) and 38(b), like helical line 18a of a rotatable rod 190 of FIG. 39(a), widths W4 of upper wide section L11 and lower wide section L15 are greater than width W3 of middle narrow section L13.

The difference between width W4 of the upper wide section and width W3 of the middle narrow section may range from 0.1 to 1.0 mm but is not limited thereto.

Upper wide section L11 and lower wide section L15 of helical lines 18a, 18b, 19a, and 19b may extend in a straight line by certain lengths in the longitudinal directions of rotatable rods 190A and 190B but are not limited thereto.

Figure 39:
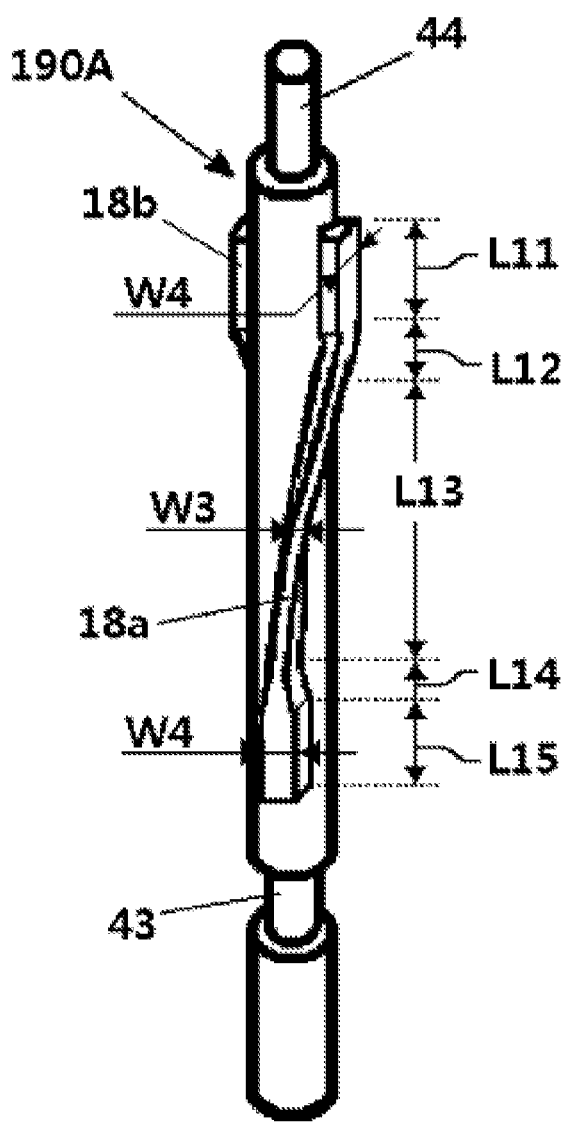
FIG. 39 is an enlarged view illustrating one of the rotatable rods of FIG. 38.

The structure of rotatable rod 190A as shown in FIG. 39(a) may prevent rotatable rods 190A and 190B from rocking unstably left and right when helical line coupling portions 810 and 820 and helical line coupling portions 830 and 840 installed on both sides of cross bar 8 are positioned in upper wide section L11 or lower wide section L15 of helical lines 18b and 18a and helical lines 19a and 19b. On the contrary, helical line coupling portions 810 and 820 and helical line coupling portions 830 and 840 can slide smoothly in the vertical direction in middle narrow section L13.

Upper wide section L11 and middle narrow section L13 are connected by upper connecting section L12. Upper connecting section L12 has a structure with a width that becomes broader from bottom to top.

Similarly, middle narrow section L13 and lower wide section L15 are connected by lower connecting section L14. Lower connecting section L14 has a structure with a width that becomes broader from top to bottom.

The shapes of rotatable rods 190A and 190B of FIG. 37 are merely examples, and the present invention is not limited thereto.

Figure 38:
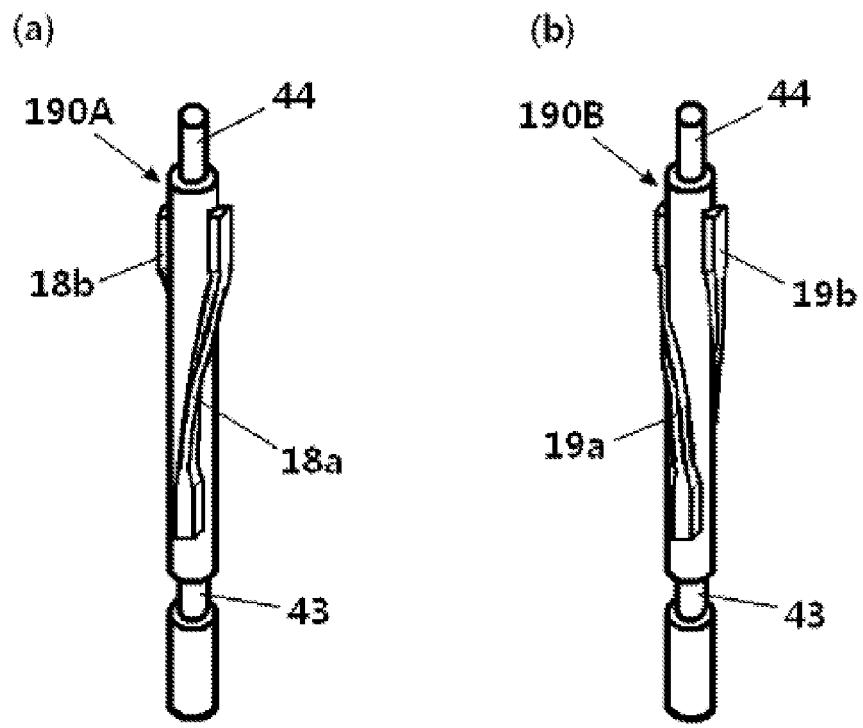
FIG. 38 is a schematic perspective view of the rotatable rods applicable to the carrier of FIG. 34.

The shapes of rotatable rods 190A and 190B of FIG. 38 are merely examples, and the present invention is not limited thereto.

DESCRIPTION OF REFERENCE NUMERALS 1, 2, 2', 4, 6, 8: Cross bars
3, 3', 5, 7: Guide bars
10a, 10b, 11a, 11b, 12a, 12b, 13a, 13b, 14a, 14b: Helical lines
15a, 15b, 16a, 16b, 17a, 17b, 18a, 18b, 19a, 19b: Helical lines
21, 22, 23a, 23b, 24a, 24b, 27, 28: Helical line coupling portions
25, 26: Connecting portions
31, 32, 33, 34, 35: Elastic members
36: Pusher
37: Housing
39: Slot
41, 42: Sleeves
46, 47, 48, 49: Sleeves
51, 52, 57, 58: Guide rails
51', 52', 53, 54, 55: Sleeves
56: Sleeve groove
61, 62, 63, 64, 67, 68, 69: Handle bars
65, 66: Handle bar extending portions
71, 72, 73, 74: Wheel supporters
81, 82: Connecting portions
83, 84, 85, 86: Concave portions 810, 820, 830, 840: Helical line coupling portions
92: Elastic member
93, 94: Cross bars
95: Rope
96: Traction bar
97: Switching shaft
99: Fastening means
102, 103, 104, 110, 120, 130, 140, 130', 140': Rotatable rods
150, 160, 170, 180, 190A, 190B: Rotatable rods
201, 202, 203: Castors
210, 220: Wheels
310, 320: Rotatable rods
330, 340: Wheels
350, 360: Handle bars
370: Handle
400, 410, 420, 430, 440, 450: Bodies
500: Frame
501: Bracket
502: Sleeve
510: Left supporter
511, 512: Spacers
520: Right supporter
521, 522: Spacers
530: Lower supporter
540: Middle supporter
541, 542: Holders
550, 560: Connecting supporters
570: Upper supporter
571, 572: Holders
610, 620, 630, 640: Handles
810, 820, 830, 840: Helical line coupling portions
900: Loading plate
1000, 1100, 1200, 1300, 1400, 1500, 1600, 1700: Carriers
L1: Upper narrow section
L2: Upper connecting section
L3: Middle wide section
L4: Lower connecting section
L5: Lower narrow section
L11: Upper wide section
L12: Upper connecting section
L13: Middle narrow section
L14: Lower connecting section
L15: Lower wide section

The invention claimed is:

1. A device for turning rotatable rods for folding or unfolding wheels of a carrier, comprising:
a pair of rotatable rods, each comprising one or more helical lines;
a cross bar, which comprises one or more helical line coupling portions slidably coupled with the one or more helical lines on both sides and connects the pair of rotatable rods to each other;
a frame or a body on which the pair of rotatable rods are rotatably installed; and
one or more handle bars separated from the cross bar and installed on the frame or the body to be vertically slidable.

2. The device of claim 1, wherein the one or more handle bars can come into contact with or be separated from the cross bar due to the vertical sliding of the one or more handle bars.

3. The device of claim 1, wherein the distance of vertical movement of the cross bar is shorter than the vertically slidable distance of the one or more handle bars.

4. The device of claim 1, further comprising one or more elastic members, which provide restoring force to the cross bar upward or downward.

5. The device of claim 1, further comprising one or more guide bars, which stretch from the cross bar upward or downward by certain lengths.

6. The device of claim 1, wherein each of the helical lines is formed as a groove, each of the helical line coupling portions is formed as a pin, and the helical line coupling portions are correspondingly inserted into the grooves of the helical lines so that the helical line coupling portions can slide along the helical lines.

7. The device of claim 6, wherein each of the helical lines comprises an upper narrow section and a middle wide section.

8. The device of claim 1, wherein each of the helical lines protrudes and comprises convex portions, each of the helical line coupling portions comprises concave portion, and the convex portions of the helical lines are correspondingly inserted into the concave portions of the helical line coupling portions so that the helical line coupling portions can slide along the helical lines.

9. The device of claim 8, wherein each of the helical lines comprises an upper wide section and a middle narrow section.

10. The device of claim 1, wherein a wheel is connected to each of the pair of rotatable rods.

11. The device of claim 1, wherein the body is any one of a bag, a suitcase, a trunk, or a golf bag.

* * * * *